United States Patent
Revell et al.

(10) Patent No.: US 9,478,141 B2
(45) Date of Patent: Oct. 25, 2016

(54) IDENTIFICATION AND ANALYSIS OF AIRCRAFT LANDING SITES

(71) Applicant: BAE SYSTEMS plc, London (GB)

(72) Inventors: James Duncan Revell, South Gloucestershire (GB); Roderick Buchanan, Lancashire (GB)

(73) Assignee: BAE SYSTEMS plc, London (GB)

( * ) Notice: Subject to any disclaimer, the term of this patent is extended or adjusted under 35 U.S.C. 154(b) by 279 days.

(21) Appl. No.: 14/354,048

(22) PCT Filed: Oct. 25, 2012

(86) PCT No.: PCT/GB2012/052656
§ 371 (c)(1),
(2) Date: Apr. 24, 2014

(87) PCT Pub. No.: WO2013/061066
PCT Pub. Date: May 2, 2013

(65) Prior Publication Data
US 2014/0297068 A1 Oct. 2, 2014

(30) Foreign Application Priority Data

Oct. 28, 2011 (GB) .................................. 1118694.7

(51) Int. Cl.
*G06K 9/62* (2006.01)
*G08G 5/02* (2006.01)
(Continued)

(52) U.S. Cl.
CPC ............... *G08G 5/02* (2013.01); *G06K 9/0063* (2013.01); *G06K 9/00637* (2013.01); *G06K 9/00651* (2013.01); *G08G 5/0021* (2013.01); *G08G 5/0086* (2013.01); *G08G 5/025* (2013.01)

(58) Field of Classification Search
None
See application file for complete search history.

(56) References Cited

U.S. PATENT DOCUMENTS 6,311,108 B1 * 10/2001 Ammar ................. F41G 7/2226
244/180
6,995,762 B1 2/2006 Pavlidis et al.
(Continued)

FOREIGN PATENT DOCUMENTS

EP 1677076 A2 7/2006
EP 2096602 A1 9/2009
(Continued)

OTHER PUBLICATIONS

International Search Report and Written Opinion of the International Searching Authority received for Patent Application No. PCT/GB2012/052656, mailed on Jul. 11, 2013, 13 pages.
(Continued)

*Primary Examiner* — Brian P Werner
(74) *Attorney, Agent, or Firm* — Finch & Maloney PLLC

(57) ABSTRACT

A method and apparatus for identifying and analyzing an aircraft landing site during flight is provided. The method includes the steps of using image capture means such as an infrared camera to capture in-flight images of the ground in the region of a possible landing site, using a database of computer modelled images of possible aircraft landing sites mapped to a global co-ordinate reference frame to compare the in-flight images with a modelled image of the possible landing site and optimizing correspondence between the two images to obtain an in-flight image optimally mapped to the global co-ordinate reference frame. Thereafter, the landing site which corresponds to the optimally mapped in-flight image is analyzed to ascertain the presence of any obstructions such as life forms, vehicles or newly erected buildings thereon.

20 Claims, 16 Drawing Sheets

Time 14:23:58.202  Lon 003:16:13.5780W
GPS Time 14:23:57  Lat 54:09:26.6940N

(51) Int. Cl.
*G06K 9/00* (2006.01)
*G08G 5/00* (2006.01)

(56) References Cited

U.S. PATENT DOCUMENTS

| | | |
|---|---|---|
| 7,579,978 B1 | 8/2009 | Finley |
| 2007/0297696 A1 | 12/2007 | Hamza et al. |
| 2009/0002364 A1 | 1/2009 | Witte, II |
| 2009/0214079 A1 | 8/2009 | Hamza et al. |
| 2009/0263038 A1 | 10/2009 | Luo et al. |

FOREIGN PATENT DOCUMENTS

| | | |
|---|---|---|
| EP | 2154665 A2 | 2/2010 |
| WO | 9901845 | 1/1999 |
| WO | 2013061066 A2 | 5/2013 |

OTHER PUBLICATIONS

GB Intellectual Property Office Search Report under Section 17(5) received for GB Patent Application No. 1118694.7 mailed Feb. 20, 2012, 4 pages.

GB Intellectual Property Office Combined Search and Examination Report under Sections 17 and 18(3) received for GB Patent Application No. 1219194.6 mailed Apr. 25, 2013, 7 pages.

Hamza, et al., "Runway Positioning and Moving Object Detection Prior to Landing," Augmented Vision Perception in Infrared: Algorithms and Applied Systems, Jan. 1, 2009, pp. 243-269.

Lindsten, et al., "Geo-referencing for UAV Navigation using Environmental Classification," 2010 IEEE International Conference on Robotics and Automation, Anchorage Convention District, Anchorage, Alaska, May 3-8, 2010, pp. 1420-1425.

McKeown, et al., "Rule-Based Interpretation of Aerial Imagery," IEEE Transactions on Pattern Analysis and Machine Intelligence, vol. PAMI-7, No. 5, Sep. 1, 1985, pp. 570-585.

Rackliffe, et al., "Using Geographic Information Systems (GIS) for UAV Landings and UGV Navigation," 2011 IEEE Conference on Technologies for Practical Robot Applications (TePRA), Nov. 4, 2011, pp. 145-150.

International Preliminary Report on Patentability received for Patent Application No. PCT/GB2012/052656, mailed May 8, 2014, 9 pages.

\* cited by examiner

Time 16:37:23.956　　Lon 002:50:14.1960W
GPS Time 16:37:22　　Lat 53:45:15.8100N

Fig. 6(b) Time 14:23:58.202　　Lon 003:16:13.5780W
GPS Time 14:23:57　　Lat 54:09:26.6940N Fig. 6(c) Time 14:32:06.450　　Lon 003:15:55.0080W
GPS Time 14:32:05　　Lat 54:09:34.4340N Time 16:37:31.956  Lon 002:50:40.8480W
GPS Time 16:37:30  Lat 53:45:10.4100N Time 16:37:31.956  Lon 002:50:40.8480W
GPS Time 16:37:30  Lat 53:45:10.4100N Time 16:37:31.956  Lon 002:50:40.8480W
GPS Time 16:37:30  Lat 53:45:10.4100N Time 16:37:39.996  Lon 002:51:07.3020W
GPS Time 16:37:38  Lat 53:45:04.9500N Time 16:37:45.796  Lon 002:51:27.5220W
GPS Time 16:37:44  Lat 53:45:00.9720N Time 16:37:47.158  Lon 002:51:34.3740W
GPS Time 16:37:46  Lat 53:44:59.6520N

Fig. 8(d) Time 14:24:00.642  Lon 003:16:13.6680W
         GPS Time 14:23:59   Lat 54:09:21.3000N
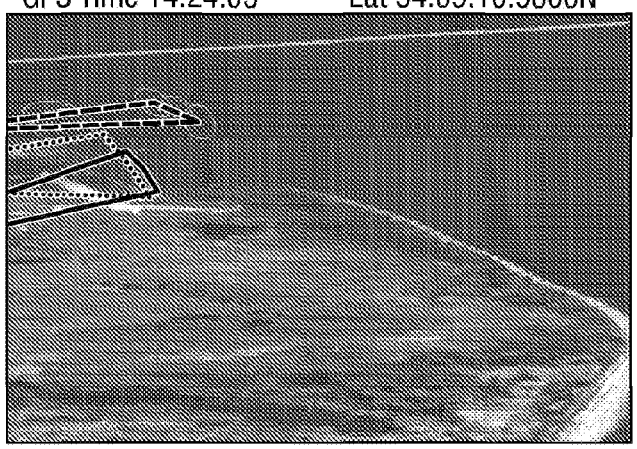
Fig. 8(e) Time 14:24:04.962  Lon 003:16:13.7940W
         GPS Time 14:24:03   Lat 54:09:10.5600N
Fig. 8(f) Time 14:24:07.322  Lon 003:16:13.7880W
         GPS Time 14:24:07   Lat 54:09:00.0360N Time 16:37:23.956   Lon 002:50:14.1960W
GPS Time 16:37:22   Lat 53:45:15.8100N Time 16:35:46.955   Lon 002:44:39.1980W
GPS Time 16:35:46   Lat 53:46:24.9960N Time 16:35:06.955   Lon 002:42:18.5820W
GPS Time 16:35:06   Lat 53:46:51.6120N Fig. 9(d) Time 14:22:28.601  Lon 003:16:19.0740W
GPS Time 14:22:27  Lat 54:13:12.6960N
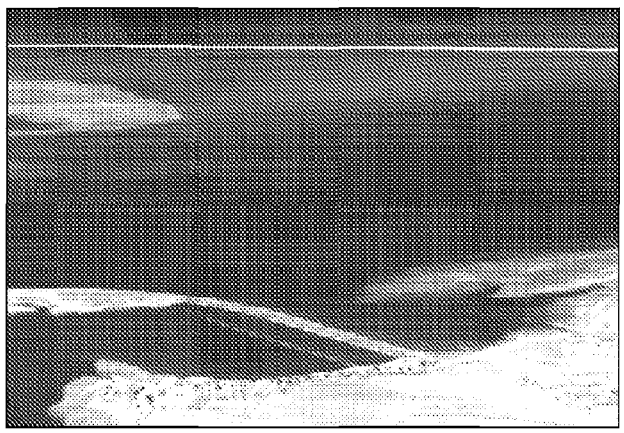
Fig. 9(e) Time 14:23:28.602  Lon 003:16:15.0780W
GPS Time 14:23:27  Lat 54:10:45.3060N
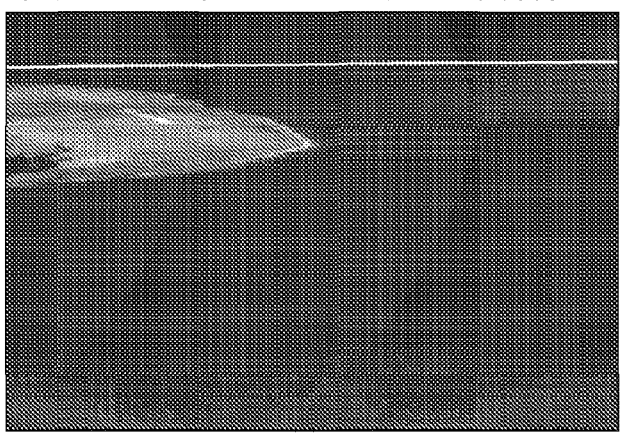
Fig. 9(f) Time 14:48:29.102  Lon 003:17:14.7840W
GPS Time 14:48:29  Lat 54:12:31.2960N
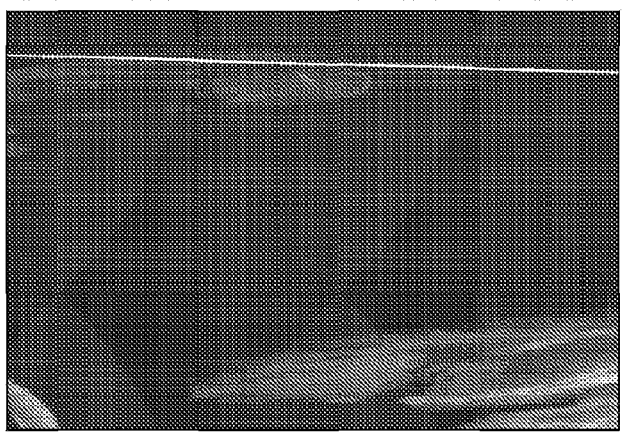

Time 16:36:51.756　　　Lon 002:48:22:5300W
GPS Time 16:36:50　　　Lat 53:45:38.4840N

Time 16:37:33.756　　　Lon 002:50:47:4600W
GPS Time 16:37:32　　　Lat 53:45:09.0480N

Fig. 10(c)　Time 14:23:55.602　　　Lon 003:16:13:4880W
　　　　　　GPS Time 14:23:55　　　Lat 54:09:32.0700N Fig. 10(d)  Time 14:24:03.402    Lon 003:16:13:7490W
            GPS Time 14:24:03     Lat 54:09:10.5600N
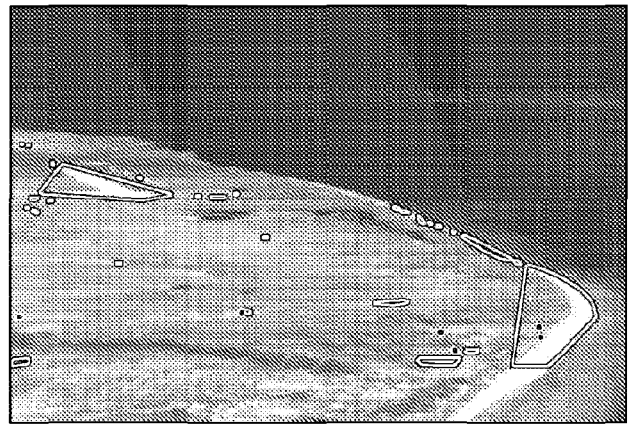
Fig. 10(e)  Time 14:32:08.450    Lon 003:15:55:3800W
            GPS Time 14:32:07     Lat 54:09:29.7420N
Fig. 10(f)  Time 14:32:22.850    Lon 003:16:00:7680W
            GPS Time 14:32:21     Lat 54:08:56.9880N
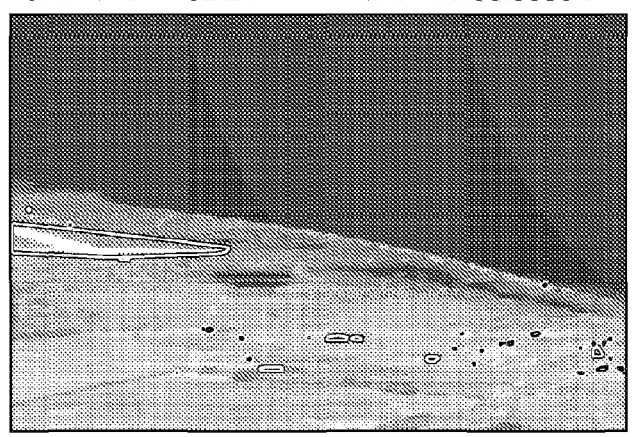

IDENTIFICATION AND ANALYSIS OF AIRCRAFT LANDING SITES

FIELD OF THE INVENTION

The present invention relates to the identification and analysis of aircraft landing sites and, more particularly, to a method of identification and analysis, during flight, of such a site for the purposes of detecting obstructions on the landing site. Such a method is particularly useful when an aircraft has to make a forced landing.

BACKGROUND

There is an increasing demand for Unmanned Aerial Vehicles (UAVs) to enter civilian airspace. This raises important flight certification issues. These are defined by the Civil Aviation Authority (CAA) for the United Kingdom in the directorate of airspace policy. The key objective is for UAVs to demonstrate an equivalent level of safety to that of manned aircraft. An important issue is to enable UAVs to use alternative landing sites as a result of an onboard fault or failure, which causes the planned landing site to be out of reach. The CAA states that they, "may think fit to apply . . . a prohibition on flight unless the aircraft is equipped with a mechanism that will cause the said aircraft to land in the event of a failure . . . ". Currently UAVs on military missions typically use either parachutes to land in an unknown position or flight termination systems including remote detonation where the UAV does not attempt to land.

In the case of manned aircraft, during emergencies pilots use a combination of local geographical knowledge and visual observations to select an alternative site. This is evident in real-life examples such as US Airways flight 1549, an Airbus A320 jet. The piloted aircraft was successfully ditched in the Hudson river in 2009 after bird strike during climb out.

One of the earliest autonomous aircraft landings using computer vision was demonstrated in 2002. A heliport landing site was detected and tracked in images, using appearance based information using a camera fixed perpendicular to the ground. By low pass filtering, binarising and performing connected component labelling, a set of candidates regions was determined. Object recognition was performed by calculating geometric information such as perimeter, area and moments for each candidate region. Experiments used a small scale remote control helicopter with differential-GPS.

Fixed-wing miniature air vehicles have also been used to research flight stability. Such vehicles typically use image processing to detect the position of the horizon line in the image. This relies upon recognising the appearance of sky and ground terrain using colour information. However, this image based solution requires that the detected horizon line also measures the aircraft's orientation with respect to the ground. Traditionally, these measurements were independent of any onboard positioning sensors.

A survey paper by Gong and Abbotty particularly emphasises the use of computer vision techniques for detecting and tracking airport runways. Some of these techniques rely on model-matching. The objective of model-matching is to estimate the position and orientation of the modelled object with respect to the local coordinate frame. Autoland is a commercial system, which matches a geometric model of a predefined target to image features.

A model-matching approach has also been used for terrain aided localisation using electro-optical sensing. Neither solution relies on GPS or onboard pose information.

Algorithms have been proposed which use an estimate of the imaging projective transform parameters to project points of a prior model into the image. These points are then associated with feature points extracted in the image. The horizontal and vertical pixel errors between each point correspondence are then expressed by two equations. These use the sum of the products of its partial derivatives multiplied by an unknown multi-dimensional vector of corrections to the parameterisation of the imaging projective transform. The process is iterated until convergence or a maximum number of iterations is reached.

Other techniques include estimating the optical flow between frames. This approach has been used to automate the landing of miniature aircraft. Further, in 2007 the automatic detection and selection of regions in an image that could be designated as suitable for landing was successfully demonstrated. This approach required no prior landing site position information, but relied on having good quality imagery of the terrain at the appropriate scale. Furthermore the camera was restricted to being perpendicular to the ground plane and the solution provided no geospatial referencing of the chosen region to the global coordinate frame.

Research into the same problem has also been performed using a downward-scanning LADAR to determine terrain slope, roughness and obstacles for identifying a landing site.

SUMMARY OF THE INVENTION

In a first aspect, the present invention provides a method of identifying and analysing an aircraft landing site during flight, the method including the steps of using image capture means to capture in-flight images of the ground in the region of a possible landing site, using a database of computer modelled images of possible aircraft landing sites mapped to a global co-ordinate reference frame to compare the in-flight images with a modelled image of the possible landing site and optimising correspondence therebetween to obtain an in-flight image optimally mapped to the global co-ordinate reference frame, and analysing a landing site corresponding to the optimally mapped in-flight image to ascertain the presence of any obstructions thereon.

The analysis of the landing site for obstructions may include the step of analysing the in-flight image to detect image intensity above a threshold value, whereby to determine the presence of an obstruction.

The analysis of the landing site for obstructions may include the step of analysing the portion of the in-flight image corresponding to the obstruction to detect the surface area of the obstruction.

The analysis may include the step of calculating a convex hull for the obstruction to define multiple polygons in the image.

Each polygon may be back projected from a local image co-ordinate frame to the global co-ordinate reference frame, whereby to calculate the actual area of the obstruction and detect area above a threshold value.

The method may include the step of computing the probability of a said obstruction being present on the landing site by comparing a number of time varying in-flight images to determine the relative frequency of the obstruction being detected.

The method may include the step of determining terrain characteristics of the landing site and/or presence of obstructions on the landing site by obtaining a measure of randomness of spatial information present in a said in-flight image.

The measure of randomness of spatial information may be obtained by computing a statistical measure of the said randomness based on image intensity estimated from a grey-level histogram.

The method may include optimising correspondence between in-flight images and a modelled image which may include creating a random sample of possible landing site in-flight images spread about the mean position, translating each image into the global co-ordinate reference frame and comparing each said image with the expected mean image intensity of the landing site in the global co-ordinate reference frame ("the appearance prior") and ranking each said image accordingly by minimising the difference between the sample mean intensity and the expected mean intensity whereby to optimise correspondence between in-flight images and a said modelled image.

The method may include the step of applying a Kalman filter to filter optimally mapped in-flight images in time.

The method may include the step of estimating the horizon line in the optimally mapped in-flight image by applying geometric back projection of features in the global co-ordinate reference frame into the in-flight image.

According to a second aspect of the invention there is provided apparatus for identifying and analysing an aircraft landing site during flight, the apparatus including image capture means adapted to capture in-flight images of the ground in the region of a possible landing site, a database of computer modelled images of possible aircraft landing sites mapped to a global co-ordinate reference frame, comparison means to compare the in-flight images with a said modelled image of the possible landing site and optimising means to optimise correspondence therebetween to obtain an in-flight image optimally mapped to the global co-ordinate reference frame, and means to analyse a landing site corresponding to the optimally mapped in-flight image to ascertain the presence of any obstructions thereon.

BRIEF DESCRIPTION OF THE DRAWINGS

FIG. 6 illustrates example frames for data set 121 showing projected points onto the image plane (dark blue) and associated ncertainty ellipses (cyan).

It is an aim of the present work to improve the estimate of the position of the landing site, by using a geospatial camera observation model to provide an initial position estimate. Due to the distance from the target and low image resolution, the requirement to extract feature points in the image that correspond to the landing site is impractical. Instead we generate the same multi-dimensional vector of measured error terms but generate a set of samples. Each of these samples is tested using an appearance constraint to select the best fitting model to the data. These measurements are then combined in time using a simple exponential smoother. Also, we note that our prior 3D model of points is defined in the global coordinate frame and that the observation model we define has a high dimensional parameter space.

DETAILED DESCRIPTION

The system is being developed for the BAE Systems Military Air Solutions Flying-Test-Bed Jetstream aircraft, which acts as a surrogate UAV. During this research, the aircraft was equipped with a Thermoteknix Miricle 307 infrared camera in a fixed angled pan and tilt position installed in the undercarriage behind a Germaniun coated glass cover. The camera, camera mount, aircraft and baggage pod are shown in FIGS. 2(a), 2(b), 2(c) and 2(d), respectively. This sensor is an uncooled microbolometer with a resolution of M×N=640×480 detecting wavelengths between 7-14 μm in the long-wave infrared spectrum. This is coupled to the widest angle lens available that could be installed (see Table 3). The analogue video output is digitised by a GE Series Fanuc. The digital video output is recorded using a STACK DVR2-440, which is a ruggedised solid state MPEG-2 encoder with time-stamp and GPS overlays. The video data is recorded at 25 Hz. A Honeywell Laser Inertial Navigation System (LINS) with a GARMIN GPS 496 and barometric altimeter records the global pose and position of the UAV. This is recorded at a pre-configured rate of 50 Hz. The video data is time stamped with the real-time clock from the STACK and the GPS, but is currently only available as an embedded image overlay. The mount position of the camera with respect to the INS was measured using a Leica Laser. Some additional position offsets were required due to the UAV design and hardware layout. These were determined from computer aided designs of the aircraft in conjunction with Cranfield Aerospace.

Figure 1:
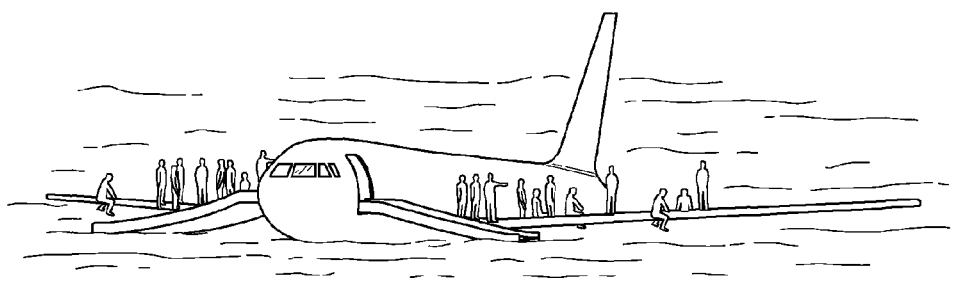
FIG. 1 is a photo of US Airways Flight 1549 after crashing into the Hudson River in New York City, US.
Figure 2A:
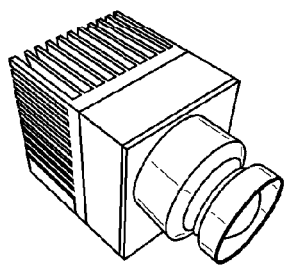
FIG. 2 is an illustration of (a) a Thermoteknic Miricle 307 infrared camera, (b) Camera installed in a baggage-pod adjustable declination mount, (c) BAE System Jetstream Flying-Test-Bed aircraft (FTB G-BVVVVVV), (d) Germanium window for the camera in the baggage-pod.
Figure 2B:
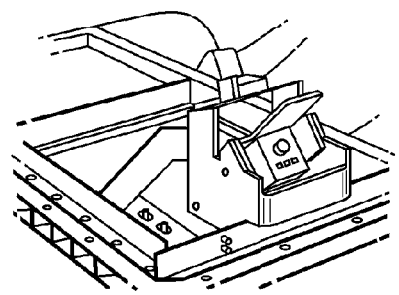
Figure 2C:
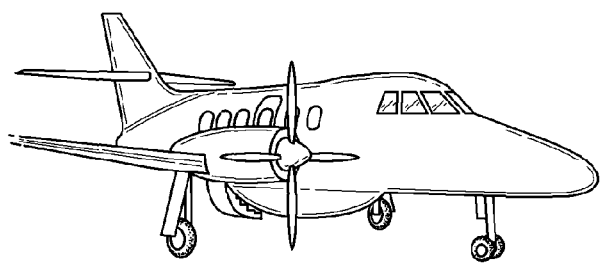
Figure 2D:
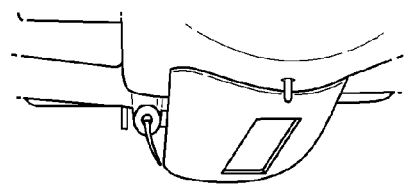
Figure 3A:
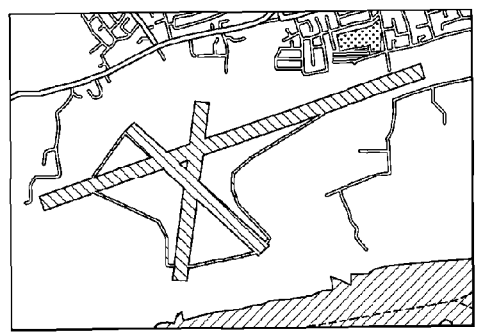
FIG. 3 illustrates maps from Openstreetmap of two of the locations of the forced landing sites captured during flight trials (a) Warton Aerodrome (b) Isle of Walney airport.
Figure 3B:
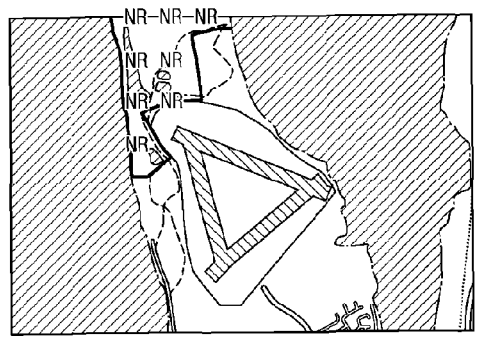
Figure 4A:
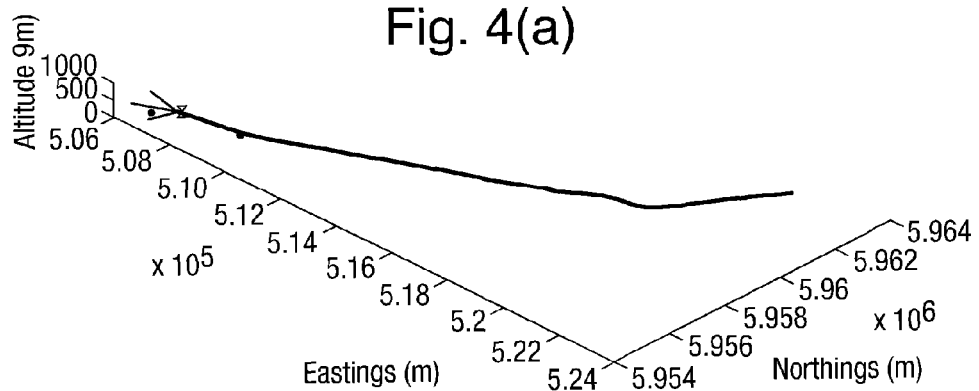
FIG. 4 illustrates example trajectories of the aircraft in the world (blue line), the camera FOV limits (red lines) and the GPS landmarks (black circles) for both data sets 121 and 160 in (a) and (b), respectively.
Figure 4B:
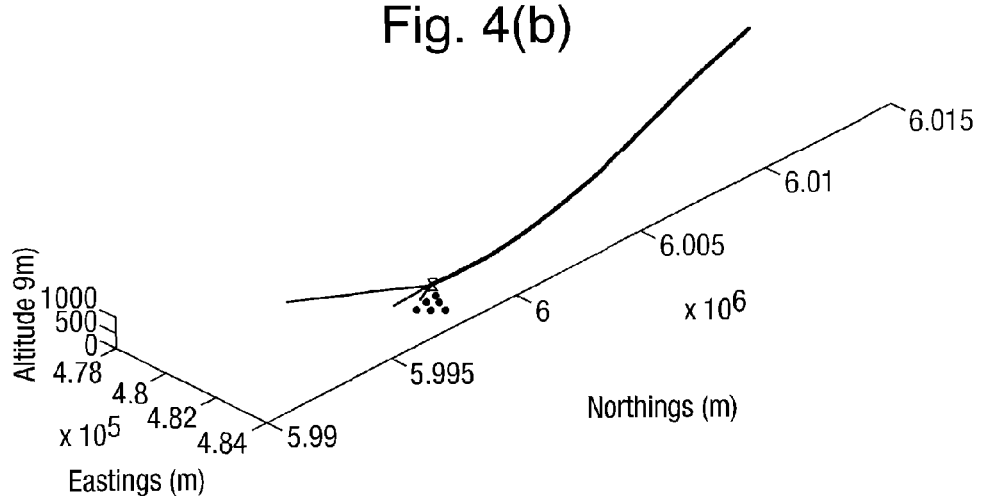
Figure 5B:
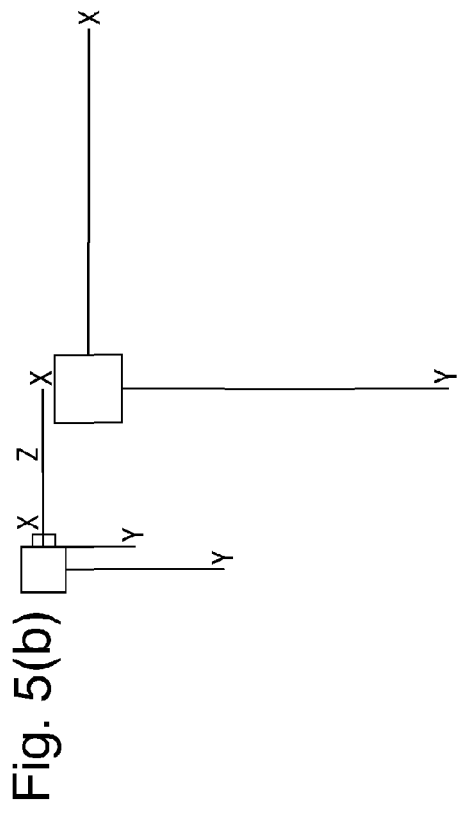
FIG. 5 illustrates (a) isometric, (b) plan, (c) side and (d) in-situ views of the INS (largest cube), camera mount (medium cube) and camera (smalles cube) coordinate systems.
FIG. 5d also illustrates the projected camera FOV limits and 3D uncertainty ellipse for the INS.
Figure 5D:
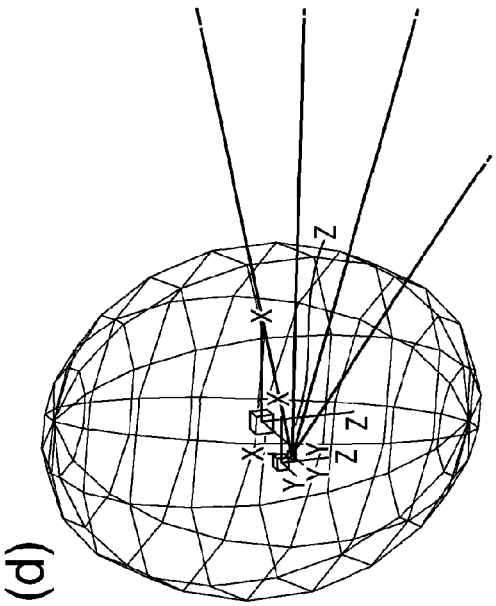
Figure 5A:
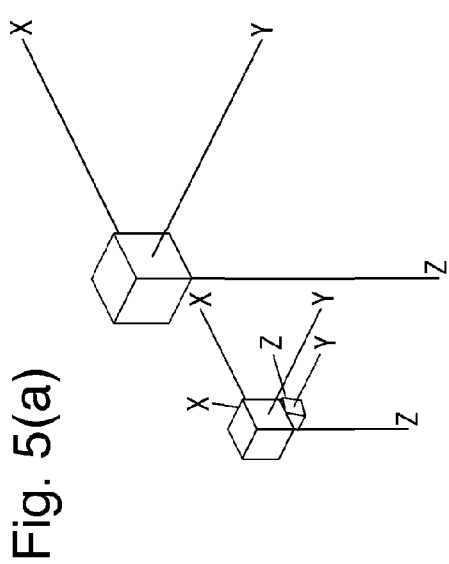
Figure 5C:
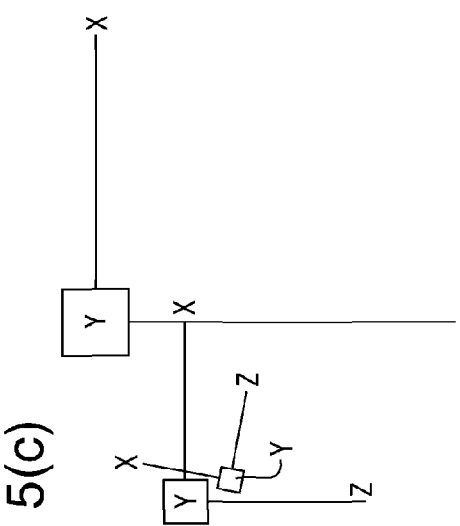
Figure 6A:
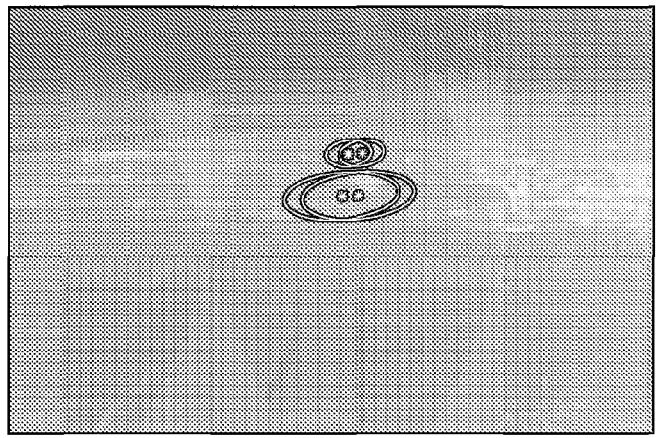
FIG. 6(a) illustrates 4 points defining the main rectangular part of the runway, (b) 6 points along the triangular set of runways and (c) 4 points along the boundary of a pond.
Figure 6A:
Figure 6A:
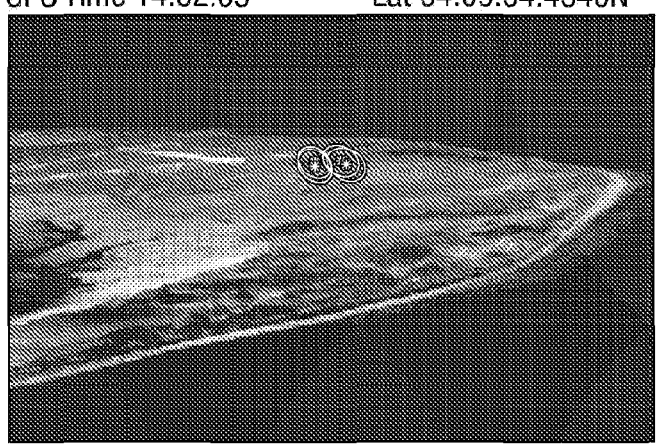

Several flight trials were organised during the research to assess the computer vision system. Most of the trials were based around two locations. The first location was the BAE Systems Warton Aerodome located near to Warton village on the Fylde in Lancashire, England. The second location was the BAE Systems airport on the Isle of Walney, located just north-west of the centre of Barrow-in-Furness, Cumbria, England. The latter, due to its location, allowed the scenario to be more controlled. The layout of the runways are shown in the maps in FIG. 3 and brief descriptions of the data sets captured in Table 1. With the exception of a few seconds at the start of the flights, the landing site is not visible at the beginning nor end of the flight. This is typical, since at the start of the flight trial the aircraft is manoeuvring to observe the landing site. Whilst at the end, the aircraft is pulling up in order not to land but to perform another fly-pass.

Data sets 121 and 160 have no indications of life-forms present in the landing site ROI, but may well do beyond this region.

TABLE 1

Table describing the data sets used in the experiments

| Data set ID | Trial sortie | Brief description | Indications of life-forms | Duration MM:SS | Date DD/MM/YY |
|---|---|---|---|---|---|
| 121 | 1-2 | Warton, auto contrast settings | 0 | 04:13:60 | 24/02/11 |
| 160 | 2-3 | Walney, manual contract adjustments | 0 | 03:20:44 | 07/04/11 |

During each trial the aircraft descended from approximately 1000 m to 100 m above ground level (AGL) at an angle of declination of approximately 4°. Since the camera was in a fixed position the pilot was requested to maintain the landing site within the camera field of view (FOV) supported by a co-pilot using a tablet monitor. Apart from the obvious landing sites of the runway several less obvious sites were chosen, for example, a pond. The altitude measurements were taken from the official above mean sea level (AMSL) data for these sites. In Table 2 we provide some sample GPS landmarks of three surveyed sites.

TABLE 2

Table to provide a set of example GPS coordinates of three ROIs defining possible landing sites.

| Warton Aerodrome | | | Isle of Walney Airport | | | Isle of Walney Minor Pond | | |
|---|---|---|---|---|---|---|---|---|
| Lat (°) | Long (°) | Alt (m) | Lat (°) | Long (°) | Alt (m) | Lat (°) | Long (°) | Alt (m) |
| 53.749083 | −2.864002 | 17 | 54.136562 | −3.272213 | 13 | 54.133041 | −3.269205 | 13 |
| 53.746829 | −2.863787 | 17 | 54.136273 | −3.270882 | 13 | 54.131130 | −3.263555 | 13 |
| 53.741469 | −2.900033 | 17 | 54.135141 | −3.271161 | 13 | 54.129671 | −3.256860 | 13 |
| 53.741951 | −2.900566 | 17 | 54.135267 | −3.272363 | 13 | 54.127056 | −3.261752 | 13 |
| ... | ... | ... | ... | ... | ... | 54.124742 | −3.266301 | 13 |
| ... | ... | ... | ... | ... | ... | 54.129219 | −3.267932 | 13 |

The sensor model defines the geometric relationship between a 3D point and its corresponding perspective projected 2D point in the image plane ($\mathcal{P}^3 \rightarrow \mathcal{P}^2$). We express the intrinsic camera properties of the sensor model as the matrix K defined as:

$$K = \begin{bmatrix} f_x/S_x & \zeta_x f_x & O_x \\ 0 & \zeta_r(f_y/S_y) & O_y \\ 0 & 0 & 1 \end{bmatrix} \quad (1)$$

where $O_x$ and $O_y$ are the principle point position coordinates (image plane and optical axis intersection). These define the origin of the pixel coordinate system located at the bottom left of the image, with the optical axis perpendicular to the centre of the image. Parameters $\zeta_r$ and $\zeta_s$ model the pixel aspect ratio and skew of the pixels respectively. The terms $f_x$ and $f_y$ are the focal length in pixel units using:

$$f_x = \frac{Mf}{C_x} \quad f_y = \frac{Nf}{C_y} \quad (2)$$

where $C_x$, $C_y$ are the CCD dimensions in millimeters, M and N the width and height of the image in pixels respectively and $S_x$, $S_y$ are the pixel scaling values. Example values used in our experimental setup for these terms are shown in Table 3.

Next we compensate for radial and tangential distortion caused by the camera lens. Let $p=(u,v)^T$ and $p_d=(u_d, V_d)^T$ be the corrected and measured distorted (d) pixel positions respectively from forward projection using Equation 7. The relationship between p and $p_d$ can be modelled with a lens distortion model L expressed as:

$$\begin{pmatrix} u - O_x \\ v - O_y \end{pmatrix} = L(r_d) \begin{pmatrix} u_d - O_x \\ v_d - O_y \end{pmatrix} \quad (3)$$

where $L(r_d)$ is based on parameters $\kappa_1$, $\kappa_2$ and $\kappa_3$ corresponding to a third degree polynomial and $\kappa_4$ a translation displacement, defined as:

$$L(r_d)=1+\kappa_1 r_d^4 + \kappa_2 r_d^3 + \kappa_3 r_d^2 + \kappa_4 r_d \quad (4)$$

where k influences the size of the FOV. The term $r_d^n$ for order n corresponds to the normalised radius of an image pixel defined as:

$$r_d^n = (u_d - O_x)^n + (v_d - O_y) \quad (5)$$

A perfect lens would have $\kappa_{1,2,3}=0$ and $\kappa_4=1.0$, leaving $p=p_d$.

The calibration process for estimating $\kappa$ requires the undistorted image generated from using inverse mapping. This consists of scanning each pixel in the output image and re-sampling and interpolating the correct pixel from the input image using the inversion of the radial lens distortion model. This is carried out for several images of a scene with targets of a known geometric correctness in the world. In our case experiments showed it was sufficient to only optimise $\kappa_2$ for correcting the apparent barrel distortion. Table 3 records the actual parameter values used in the experiments.

TABLE 3

Table to provide a set of example intrinsic camers parameters used in the system.

| M | N | f | $\zeta_r$ | $\zeta_s$ | HFOV | VFOV | DFOV | K |
|---|---|---|---|---|---|---|---|---|
| 640 pixels | 480 pixels | 32 mm | 1 | 1 | 28.2° | 21.2° | 34.7° | $\begin{bmatrix} 826.6 & 0 & 320 \\ 0 & 826.6 & 240 \\ 0 & 0 & 1 \end{bmatrix}$ |
| $C_x$ | $C_y$ | $O_x$ | $O_y$ | $S_x$ | $S_y$ | $\kappa_1$ | $\kappa_2$ | $\kappa_3$ |
| 8.8 mm | 6.6 mm | M/2 | N/2 | 6 | 6 | 0.001 | 0.02 | 0.001 |

Table 3: Table to provide a set of example intrinsic camers parameters used in the system.

Both the position of the UAV and the landing site coordinates are recorded as geographic latitude and longitude ellipsoid bearing coordinates direct from the onboard INS. These are converted to the metric-based cartesian Universal Transverse Mercator (UTM) coordinate system. The UTM coordinate system defines many map projections. We use zone 30U to calculate northings and eastings using the world geodetic system standard WGS84. For the United Kingdom this defines the Earth's equatorial semi-major axis radius of 6,378,137.0 m, semi-minor axis 6,356,752.314245 m and first eccentricity squared of 0.006694380004260827.

We define three coordinate frames. First, the INS position T.sub.w(x, y, z) and orientation as R.sub.w(.theta..sub.x, .theta..sub.y, .theta..sub.z).

Second, the camera mount position $T_m$(x, y, z) and orientation as $R_m(\theta_x, \theta_y, \theta_z)$. Third, the sensor position $T_c$(x, y, z) and orientation as $R_c(\theta_x, \theta_y, \theta_z)$. The INS coordinate system uses the North-East-Down (NED) convention where the X-axis extends positive forward (North), the Y-axis extends positive right (East) and the Z-axis extends downwards (Down) but positive up. The camera sensor is displaced relative to the camera mount, which is in turn displaced with respect to the INS. The camera optical axis is parallel to the camera sensor Z-axis. All transforms use a right handed coordinate systems with associated positive (forward) rotations. The orientations $R_w$, $R_m$ and $R_c$ are formally defined as:

$$R_{w,m,c}(\theta_x, \theta_y, \theta_z) = \begin{bmatrix} 1 & 0 & 0 \\ 0 & \cos\theta_x & -\sin\theta_x \\ 0 & \sin\theta_x & \cos\theta_x \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} \cos\theta_z & -\sin\theta_z & 0 \\ \sin\theta_z & \cos\theta_z & 0 \\ 0 & 0 & 1 \end{bmatrix} \quad (6)$$

where $T_{w,m,c}$ and $R_{w,m,c}$ define the pose of each coordinate frame of the forced landing system for the Jetstream.

This allows for 6 degrees of freedom (DoF) for the INS, another 6 DoF for the sensor mount and a further 6 DoF to allow the sensor to be turreted. Due to the aircraft configuration, from here in, both the latter $T_m$, $R_m$, $T_c$ and $R_c$ were fixed, reducing the system to 6 DoF. The values used for the fixed parameters are given in Table 4.

TABLE 4

Table to provide a set of examples extrinsic model parameters used in the system.

| $T_c(x)$ | $T_c(y)$ | $T_c(z)$ | $T_m(x)$ | $T_m(y)$ | $T_m(z)$ |
|---|---|---|---|---|---|
| 0.25 m | 0 m | 0.5 m | $-2$ m | $-0.5$ m | 1 m |
| $R_c(\theta_x)$ | $R_c(\theta_y)$ | $R_c(\theta_z)$ | $R_m(\theta_x)$ | $R_m(\theta_y)$ | $R_m(\theta_z)$ |
| 0° | 10° | 0° | 0° | 0° | 0° |

To map a 3D world point $P(x, y, z)^T$ to a point $p(u, v)^T$ on the image plane (forward projection $\mathcal{P}^3 \to \mathcal{P}^2$) we calculate:

$$p = R_c((R_m((R_w((KP)-T_w)-T_m))-T_c)) \quad (7)$$

To map a 2D point from the image plane p to a 3D world point P (back projection $\mathcal{P}^2 \to \mathcal{P}^3$) we calculate:

$$P = R_w^{-1}((R_m^{-1}((R_c^{-1}((K^-p)+T_c))+T_m))+T_w) \quad (8)$$

From herein Equations 7 and 8 are referred to as p=g(P) and P=h(p), the inverse of g, respectively. The backward projection using Equation 8 requires the inverse of the lens distortion model coefficients and will only be approximate to a linear, first-order, representation.

To back project points we require an estimate of range from our bearing only sensor. We consider that for each point in the image p there exists a collection of world points P that are projected onto the same point p. This collection of points constitute a ray connecting the centre of the camera C and the point in the image p.

The ray associated to a pixel p can be defined as:

$$P = C + \lambda h(p) \quad (9)$$

where $\lambda$ is a positive scaling factor defining the position of P on the ray. The camera centre $C(x, y, z)^T$ in the global coordinate frame is defined as:

$$C = T_w + (R_w(T_m(R_m T_c))) \quad (10)$$

In the case where z in $P(x, y, z)^T$ is known (see Equation 49), it is possible to obtain the coordinates P(x) and P(y) by calculating $\lambda$, using the relationship:

$$\lambda = \frac{z - C(z)}{P(z)} \quad (11)$$

where the denominator P(z) comes from P(x, v, z)$^T$=h(p) are the Euclidean coordinates of the observed landmark in the world. For λ<0 the ray between p and P is impossible given the value of z, which occurs when the camera observes regions of sky, that is, infinite range.

We are interested in target objects $\mathcal{O}$ and regions of interest (ROI) $\mathcal{R}$ that exist in both the image ($\mathbf{X}^{\mathcal{O}}$, $\mathbf{X}^{\mathcal{R}}$) and world domains ($\mathbf{Z}^{\mathcal{O}}$, $\mathbf{Z}^{\mathcal{R}}$) respectively. In the world domain, both $\mathcal{O}$ and $\mathcal{R}$ define a vector of world points:

$$\mathbf{Z}^{\mathcal{O}} \ \mathbf{Z}^{\mathcal{R}} = Z_t = [P_i, P_{i+1}, \ldots, P_n]^T \quad (12)$$

where $P_i(x,y,z)^T$ is a GPS point observation in UTM coordinates within the set $\mathcal{P}^3$. These describe n vertices of a non self-intersecting closed irregular polygon where t is the time index. Using Equation 7 every observation in $Z_t$ is forward projected to the image to define a vector of feature points:

$$\mathbf{X}^{\mathcal{O}} = \mathbf{X} \ \mathbf{X}^{\mathcal{R}} = X_t = [p_i, p_{i+1}, \ldots, p_n]^T \quad (13)$$

where $p_i(u,v)^T$ is a point measurement in the image along the horizontal and vertical axes within the set $\mathcal{P}^2$. We note that whilst each point in $X_t$ corresponds to point observations of landmarks in $Z_t$, the point is not necessarily a visually salient feature in the image domain. If no errors exist then the mapping of $Z_t$ to be exact, so that the re-projection error for each point observation is zero:

$$g(P_i) - \tilde{p}_i = h(p_i) - \tilde{P}_i = 0 \quad (14)$$

where $\tilde{p}_i$ and $\tilde{P}_i$ are the unknown perfect point measurements in both local and global domains. However, all the terms in the projection functions defined are prone to error. The parameters with the most significant sources of error are the INS rotation values (°), GPS measurements (m), altitude (m) and camera focal length (mm). The vector of mean values for these parameters is:

$$p = [T_w(x), T_w(y), T_w(z), R_w(\theta_x), R_w(\theta_y), R_w(\theta_z), K(f)]^T \quad (15)$$

The corresponding vector of errors is defined as:

$$\delta = [\Delta T_w(x), \Delta T_w(y), \Delta T_w(z), \Delta R_w(\theta_x), \Delta R_w(\theta_y), \Delta R_w(\theta_z),$$
$$\Delta K(f)]^T \quad (16)$$

Each element is initialised using errors based on variances from datasheets or experiments:

$$\delta = [8.0 \text{ m}, 8.0 \text{ m}, 10.0 \text{ m}, 0.1°, 0.1°, 0.1°, 2.0 \text{ mm}]^T \quad (17)$$

The error values in δ are then dynamically adjusted in time to account for synchronisation errors, so that errors are maximal during extreme manoeuvres and minimal during periods of stable flight. To do this, without INS rate information available, we differentiate each pose related term in δ with respect to time using backward finite differences. This uses the stored past pose at t-dt, where dt is a small time period. We then use an estimate of the maximum system timing error during extreme manoeuvres, defined as Δt. This is used as a scaling factor to provide an estimate of rotation and translation position error to adjust the associated error values. Finally, δ is redefined as:

$$\delta = \left[\delta_1 + \frac{d\delta_1}{dt}\Delta t, \delta_2 + \frac{d\delta_2}{dt}\Delta t, \ldots, \delta_n + \frac{d\delta_n}{dt}\Delta t\right]^T \quad (18)$$

Next we define a single measure of uncertainty for each point projection. First we assume that each of these error terms are additive and follow a normal probability distribution function with zero mean, In order to combine these into a single measure of uncertainty they have to be in the same units. This is only possible by observing their effect in the image coordinate space for each feature. The combined error is computed by constructing a covariance matrix for $p_i$ given $P_i$. Equation 19 allows the mapping of different domains:

$$Cov(p_i) = \Sigma = JWJ^T \quad (19)$$

where W=Diag(δ) since the measurements are treated as independent, and the inverse on J dropped due to the direction of the mapping. Note that $J^T J$ is the approximated Hessian. The full Jacobian J is defined by the partial derivatives of gas:

$$J = \left[\frac{\partial g}{\partial \delta_1}, \frac{\partial g}{\partial \delta_2}, \ldots, \frac{\partial g}{\partial \delta_n}\right] \text{ where } \frac{\partial g}{\partial \delta_i} = \left[\frac{\partial u}{\partial \delta_i}, \frac{\partial v}{\partial \delta_i}\right]^T \quad (20)$$

for a single equation g with n estimated variables. To calculate the partial derivatives we numerically differentiate g using a simple 2 point estimation defining Newton's difference quotient:

$$\frac{\partial g}{\partial \delta_i}(P_i, \delta_i, \delta_{i+1} \ldots, \delta_n) \approx \quad (21)$$
$$\frac{g(P_i, \delta_1, \delta_{i+1} + \epsilon_{i+1} \ldots, \delta_n) - g(P_i, \delta_i, \delta_{i+1} \ldots, \delta_n)}{\delta_i} = \frac{\Delta g(\delta_i)}{\delta_i}$$

where $\delta_i$ is the error perturbation on each selected variable g is dependent on.

To test the conditioning of Σ we calculate the 2-norm condition number τ using the eigenvalues λ of Σ:

$$Cond(\Sigma) = r = \log_{10}\left(\frac{\lambda_{min}}{\lambda_{max}}\right) \quad (22)$$

This gives an indication of the sensitivity of the perturbation, determining how much the relative input error is magnified in the relative output error. If Σ is well-conditioned then τ is low ≤6 and if Σ is ill-conditioned then τ is >6 [19]. If Σ is rank deficient then λ=0 and Cond(Σ)=∞. We note that we have not included the errors of the GPS measurements in the database.

Optimisation of the error vector S requires the correct correspondence between features in the image from the projected landmarks and extracted feature points in the image [10]. Due to the low image resolution, poor contrast and the large distance to the target, the popular feature extraction techniques of Harris, KLT, SIFT and SURF primarily using image gradient information do not produce useable feature lists. Therefore, we developed an approach without needing to rely on extracting feature points.

Figure 7A:
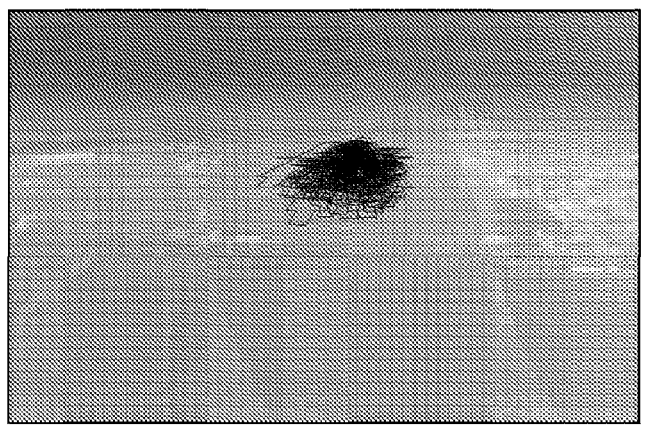
FIG. 7 illustrates a single frame with sample project ROIs representing the uncertainty in the geospatial overlayed on frames from data set 121.
Figure 7B:
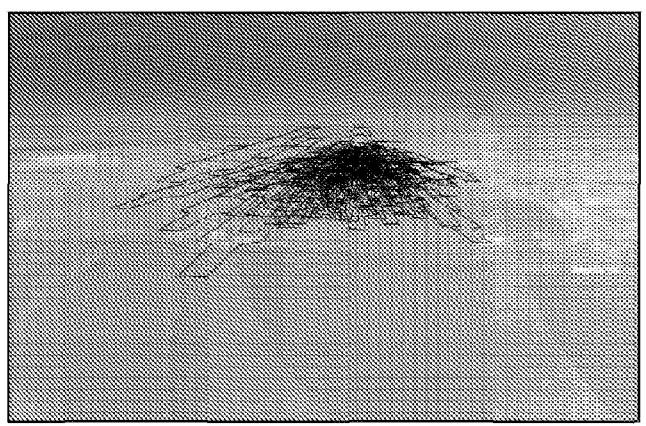
Figure 7C:
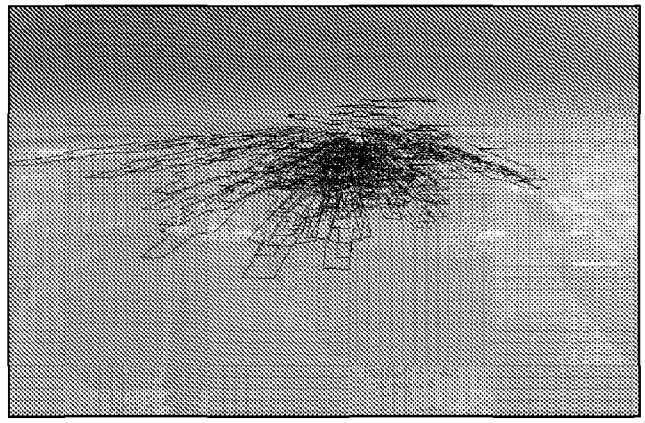

We start by defining a random sampling strategy to generate s sample measurements. The objective is to create a sample of regions of interest $\hat{X}_1^{\mathcal{R}}, \ldots, \hat{X}_s^{\mathcal{R}}$ spread about the mean measurement values in ρ. The sample is generated by applying additive noise η to every parameter in ρ using δ independently and then re-projecting the region to the image coordinate frame:

$$\hat{X}_l^{\mathcal{R}} = g(Z^{\mathcal{R}}, \rho_i + \eta_i, \rho_{i+1} + \eta_{i+1}, \ldots, \rho_n + \eta_n) \quad (23)$$

where $\eta_i \sim \mathcal{N}(\mu_{\rho_i}, \sigma_{\delta_i})$ are non-identical Gaussian distributions and when l=0 using η=0 to include the original landing site in the set. This means that each sample region $\hat{X}_l^{\mathcal{R}}$ preserves the original shape of the region defined from the database but under different perspective distortions. Samples are only generated while the region in the image is less than the image limits. Examples of the generation of 100 samples for 1σ, 2σ and 3σ confidence intervals are shown in FIG. 7. It is clear from FIG. 7 that the shape of the region can be reasonably well-defined by using GPS measurements. Also that the set of samples preserve this shape and represents feasible locations and deformations given the errors in key parameters of the observation model.

Furthermore, since image textures are frequently bounded to a region, we use an appearance prior to rank each ROI in the sample. Our appearance prior is simply the expected mean intensity K of the target in the world. We then minimise the distance between the sample mean intensity and prior:

$$\hat{X}^R = \underset{l \in s}{\operatorname{argmin}} \{ K - \operatorname{Mean}(I(k; \mathbb{P}([u, v]^T, X_l^R))) \} \quad (24)$$

To ensure only pixel intensities k bounded by the sample are used in the computation, a point-inside-polygon algorithm (P) tests the image indices are within $X_l^R$. Since the polygon may be convex or concave and potentially have self-intersections the odd-parity rule is used, where any ray from a point inside the polygon to infinity crosses an odd number of edges. This gives a complexity of O(lg(n)) for n intersections between rays and edges of the polygon.

We note that by computing the error in position between every point in $\hat{X}^R$ (generated using the vector of parameter errors δ), with every point in the original projected $X^R$ (generated using only the vector of parameter mean values ρ), we derive similar horizontal u and vertical v error terms to Lowe [10]:

$$E_u = \frac{\partial u}{\partial \rho_1}\delta_1 + \frac{\partial u}{\partial \rho_2}\delta_2 + \ldots + \frac{\partial u}{\partial \rho_n}\delta_n \quad (25)$$

$$E_v = \frac{\partial v}{\partial \rho_1}\delta_1 + \frac{\partial v}{\partial \rho_2}\delta_2 + \ldots + \frac{\partial v}{\partial \rho_n}\delta_n \quad (26)$$

However, since we have used a sampling approach we do not need to perform the iterative Newton optimisation in [10].

Before we update the parameters in the original projection equations, the vector of parameter errors are smoothed in time. Without an underlying process model of the observed time series for each parameter and equal weights not favouring current data, we simply use α exponential smoothing. This defines the weights to follow a geometric progression that is the discrete version of an exponential function. This provides a reliable estimate for predicting just one time step into the future for each parameter. When α is close to 1 more emphasis is on the previous estimated data and when close to 0 more emphasis is on the actual data than an estimation capability. We chose α=0.5 to give moderate smoothing and speed.

In this section we use a Kalman filter to provide the final estimate of the ROI position from filtering the observations in time. An observation is defined as the model fitted ROI $\hat{X}_{t-1}^R$ from the previous section. We chose to use a Kalman filter because of the added benefit of allowing a long term estimate of the ROI to be determined for making predictions. The goal of the Kalman filter is simply to build an overall model that best fits the observed sequence as a whole. We define the state $\hat{x}_t^-$ and covariance $\Sigma_t^-$ for $\hat{X}_t^R$ as:

$$\hat{x}_t^- = [\hat{X}_t^R [p_1(u)], \hat{X}_t^R [p_1(v)], \dot{u}_1, \dot{v}_1, \ldots, \hat{X}_t^R [p_n(u)], \hat{X}_t^R [p_n(v)], \dot{u}_n, \dot{v}_n]^T \quad (27)$$

$$\Sigma_t^- = \operatorname{diag}(\Sigma_{t,1}[1,1]^T, \ldots, \Sigma_{t,n}[1,1]^T) \quad (28)$$

using the convention (⁻) for before and (⁺) for after both updating or predicting. The state is initialised using the ROI model fitted measurement and the associated projected point uncertainty $\Sigma_{t,n}$ defined for each observation in Equation 19. The state is reinitialised after periods when no indications of life-forms are detected in the image. The process model describes the ROI position in terms of its previous positions using the linear kinematic model, expressed as:

$$x_t = f(x_{t-1}) + w_t \quad (29)$$

$$\hat{x}_t(1) = [\hat{x}_{t-1}(u_1), \hat{x}_{t-1}(v_1)] + [\hat{x}_{t-1}(\dot{u}_1), \hat{x}_{t-1}(\dot{v}_1)]\Delta t \quad (30)$$

where $\dot{u}_1$ and $\dot{v}_1$ are velocities in u and v pixel coordinates that are also updated in state. The observation model is also linear since all information is in the same local coordinate frame and simply provides a means of indexing into the state vector:

$$z_t = h(x_{t-1}) + v_t \quad (31)$$

Figure 8A:
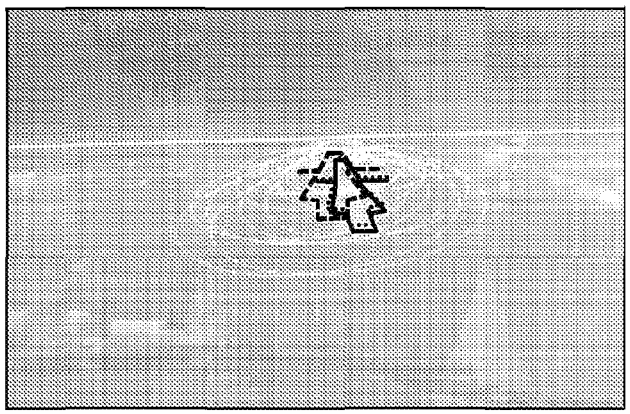
FIG. 8 illustrates single frames showing different positions from using only the camera model (dark green lines), model fitting (yellow lines) and filtering multiple observations (orange lines) from data set 121 in (a)-(c) and 161 in (d)-(f)
Figure 8B:
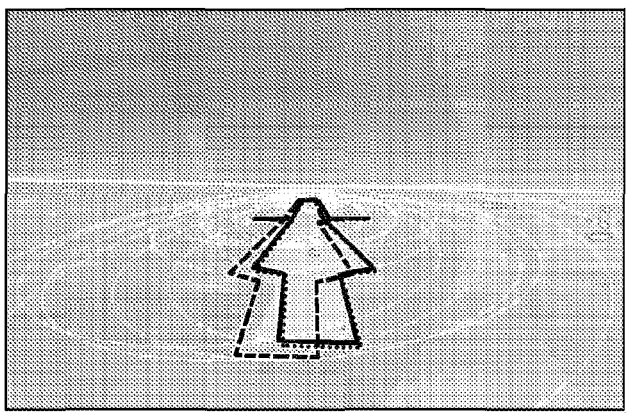
Figure 8C:
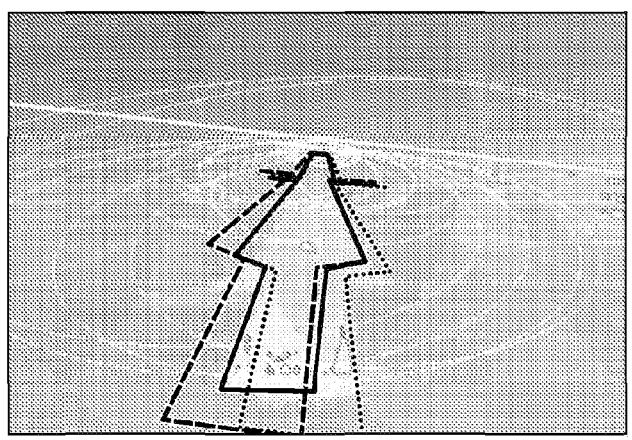

Both terms $w_t \sim N(0, Q_t)$ and $v_t \sim N(0, R_t)$ take into account perceived irregular motion of the landing site in the image as a result of, for example, aircraft turbulence and perspective distortions from, for example, rotations in depth respectively. After Kalman filter updating and predicting the final estimate of the landing site $\hat{X}_t^R$ is set from the Kalman filter state:

$$\hat{X}_t^R = [\hat{x}_t^+(1), \hat{x}_t^+(2), \hat{x}_t^+(5), \hat{x}_t^+(6), \ldots, \hat{x}_t^+(4n), \hat{x}_t^+(4n+1)]^T \quad (32)$$

for n data points. FIG. 8 illustrates example frames showing the improved positioning.

We now estimate the position of the horizon line to provide a validation test for the estimated position of the ROI. The horizon line in the image domain is defined as a straight line between points $p_a$ and $p_b$. The gradient m of this line is related to the bank angle by:

$$R_w(\theta_x) = \tan^{-1}(m) \equiv \tan^{-1}(2\pi v/(gt)) \quad (33)$$

where v is aircraft velocity, g gravitational acceleration and t the time for a 360° turn rate. Further the inclination angle is proportional to the region of image above or below the horizon line. We construct temporary image points along the vertical coordinate by n for an initial position i. All temporary points $p_{a,i}$ and $p_{b,i}$ have a horizontal value of 0 or M respectively.

$$p_{a,i} = [0, \{i-n, \ldots, i-1, i, i+1, \ldots, i+n\}]^T \quad (35)$$

$$p_{b,i} = [M, \{i-n, \ldots, i-1, i, i+1, \ldots, i+n\}]^T \quad (35)$$

Each of these points is then projected into the global coordinate frame to a zero altitude:

$$P_{a,i} = g(p_{a,i}, z=0) \quad (36)$$

$$P_{b,i} = g(P_{b,i}, z=0) \quad (37)$$

Vectors representing the ray for each temporary point to the camera centre $C^T$, defined in Equation 10, are expressed as:

$$v_1 = C^T - P_{a,i}^T \quad (38)$$

$$v_2 = C^T - P_{b,i}^T \quad (39)$$

We then project a point from the camera centre $C^T$ to the global coordinate system to make a point observation $P_c$. Again the initial altitude of zero is used.

$$P_c = g([M/2, N/2], z=0) \qquad (40)$$

Once $P_c$ is created the altitude is reset to the same value as the altitude of the camera centre:

$$P_c(z) = C(z) \qquad (41)$$

This creates a ray that is always parallel to the ground, assuming that the ground is flat, creating the vector:

$$v_3 = C^T - P_c^T \qquad (42)$$

This allows us to calculate the angle between the vector parrallel to the ground and each candidate vector:

$$\theta_i = \arg\min(|v_3| \cdot |v_1|) \qquad (43)$$

$$\theta_i = \arg\min(|v_3| \cdot |v_2|) \qquad (44)$$

By minimising the angles on both sets of vectors we use the associated index i to construct two points in the image that lie on the horizon line. On the first execution the search indexes along the whole vertical axis of the camera frame to find the global minimum. However, for every other run the previous result is used to initialise the search. This uses an upper and lower bound that are scaled by the camera frame rate.

Figure 9A:
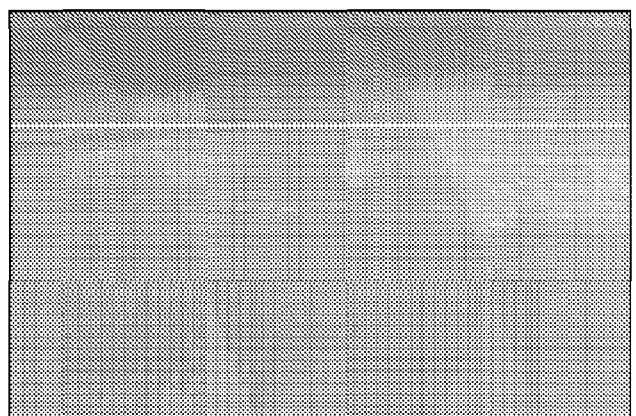
FIG. 9 illustrates sample horizons line position estimation results including some with the absence of visual information from data sets 121 in (a)-(c) and 161 in (d)-(f)
Figure 9B:
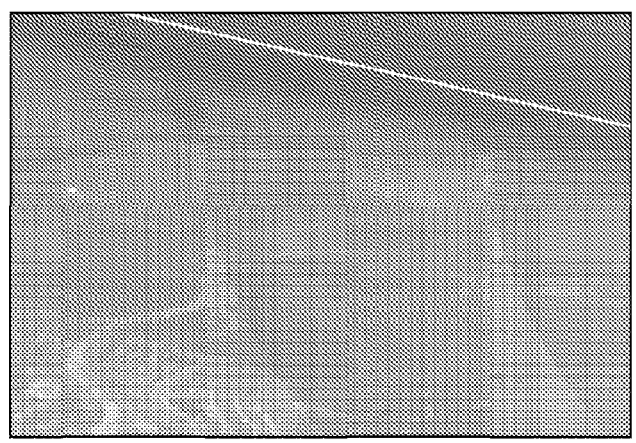
Figure 9C:
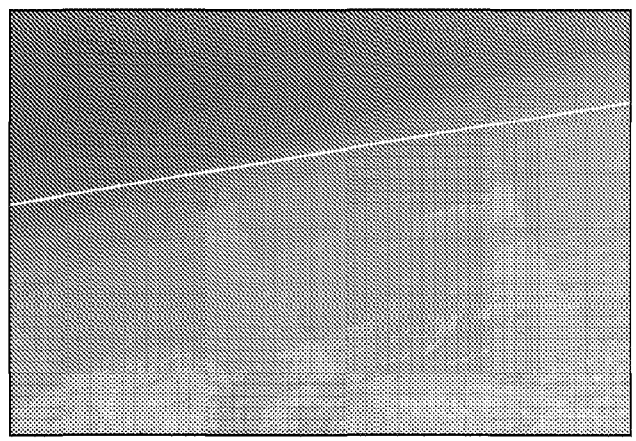

FIG. 9 shows several examples of horizon line estimation using this approach. FIGS. 9*a-c* show some visually, easy to inspect, results since the horizon can be observed. Conversely, FIGS. 9*d-f* show examples where there is no visual information to indicate the location of the horizon. We point out that this approach is sensitive to errors in data time synchronisation and errors in geospatial referencing, which are visible in FIG. 9*c*.

The rule based target object detector is used to identify objects in the image that we consider as potential indications of life-forms. The first rule is based on image intensity in the local coordinate frame. We assume that the intensity of indications of life-forms has the following normal distribution $\mathcal{N}(\mu_\beta, \sigma_\beta^2)$ and use this to calculate a lower and upper threshold for generating a binary mask:

$$\text{Mask}(u,v) = \begin{cases} 1 & \text{if } \mu_\beta - v_\beta \sigma_\beta \leq I(k; u, v) \leq \mu_\beta + v_\beta \sigma_\beta \\ 0 & \text{otherwise} \end{cases} \qquad (45)$$

for a confidence interval of $v_\beta$. Each group of true values in the mask represents a general object of interest $\mathcal{O}$. The second rule is based on the surface area of each object in m² in the global coordinate frame. This requires that we calculate the convex hull for each object to define multiple polygons in the image domain. The convex hull uses Jarvis's march to construct left and right chains, where each point is ordered clockwise based on their occurrence along the polygon. Each polygon is back projected from the local image coordinate frame to $X_j^o$ the global world coordinate frame $Z_j^o$. This requires an estimate of altitude, which is based on the mean altitude of the measurements available for the ROI, defined as:

$$z = \frac{1}{n}\sum_{i=1}^n Z^R(P_i(z; x, y)) \qquad (46)$$

By substituting all points p in $X_j^o, \ldots, X_m^o$ into Equation 9 we can define $Z_j^o, \ldots, Z_m^o$ with uniform altitude z as:

$$Z_j^o(p_0, p_{i+1}, \ldots, p_n) = C + \lambda h(X_j^o)(p_0, p_{i+1}, \ldots, p_n)) \qquad (47)$$

With the objects now projected into the world, the area of the object ($A_j$) in m² is then computed for $Z_j^o, \ldots, Z_m^o$ as:

$$A_j = \frac{1}{2}\left|\sum_{i=1}^{n-1}(Z_j^o(P_i(x) + P_{i+1}(y))(P_{i+1}(x) - P_i(y)))\right| \qquad (48)$$

A lower and upper threshold is then generated by assuming that the size of indications of life-forms have the following normal distribution $\mathcal{N}(\mu_\gamma, \sigma_\gamma^2)$. This rule is applied using the $A_j$ for each $Z_j^o, \ldots, Z_m^o$ by:

$$b(j, j+1, \ldots, m) = \begin{cases} 1 & \text{if } \mu_\gamma - v_\gamma \sigma_\gamma \leq A_j \leq \mu_\gamma + v_\gamma \sigma_\gamma \\ 0 & \text{otherwise} \end{cases} \qquad (49)$$

where b is a vector of binary values for each index j of $Z_j^o$ or $X_j^o$, and $v_\gamma$ the confidence interval that takes into account the variance of object size due to natural variation and viewing angle. This defines life-forms as closed, non-complex polygons that are white-hot in the image and of a certain size in the world.

Finally, we compute a probability for the event e that a region $X^o$ contains an object $X^o$. Thus, if $n_s$ is the total number of samples, $n_e$ the number of samples which contained an object, the probability P(e) of the event occurring is approximated by the relative frequency:

$$P(e) \approx \frac{n_e}{n_s} = \frac{1}{s}\sum_{i=1}^s \begin{cases} 1 & \text{if } \left(\sum_{j=1}^m b_j \mathbb{P}(X_j^o, \hat{X}_j^R)\right) > 0 \\ 0 & \text{otherwise} \end{cases} \qquad (50)$$

Figure 10A:
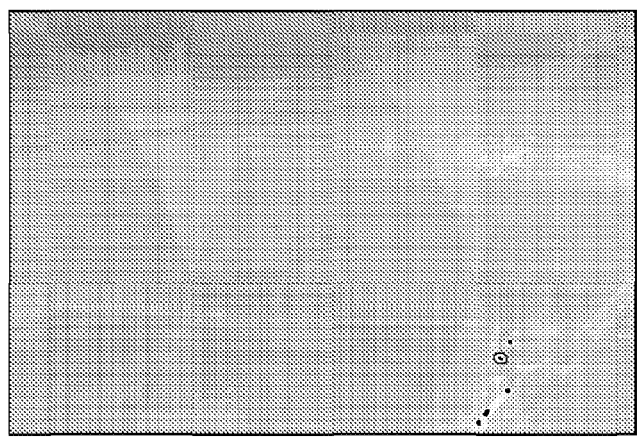
FIG. 10 illustrates sample results from using data set 121 in (a)-(b) and 161 in (c)-(f) using the rule based target object detector to illustrate the challenges of the problem.
Figure 10B:
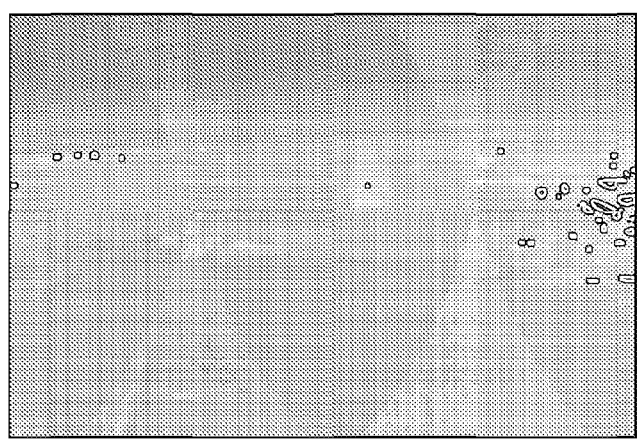
Figure 10B:
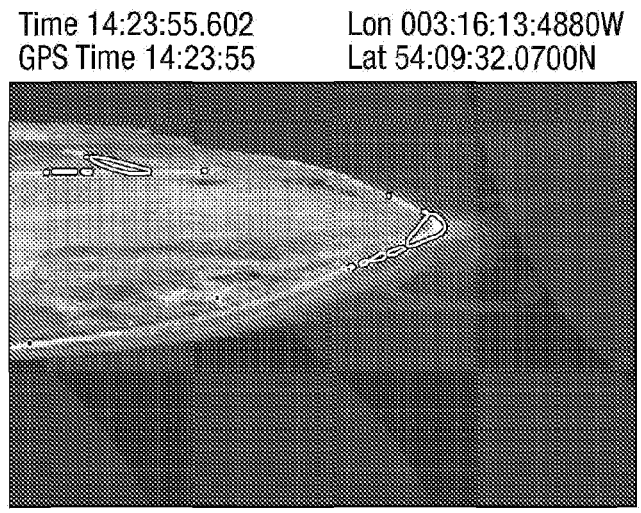

FIG. 10 shows some sample results using this rule-based object detector. The green polygons denote objects that meet the intensity requirements for indications of life-forms only. The red polygons denote objects that meet both the intensity and size requirements for indications of life-forms. FIGS. 10*a-f* all show example candidate objects that only meet the intensity requirement. These are typically building roofs and sections of roads that are correctly not classified as life-forms. The only genuine indication of life-forms is some moving cars in FIG. 10*a*, which are successfully identified. FIG. 10*d-f* also show some other classifications of indications of life-forms that are unknown positives since they are not persistent in time.

In this section we measure the information content in the ROI to understand the landing site terrain characteristics and presence of obstacles. This is achieved by computing the entropy value, which is a single statistical measure of the randomness of the spatial information present. Entropy is based on image intensity and is estimated from a grey-level histogram. We start by estimating the probability of occurrence of a grey-level k in the ROI using the histogram H as:

$$P(k) \approx \frac{H(k)}{A} \qquad (51)$$

where A comes from Equation 48 but substituting $\mathbf{Z}^O$ with $X^o$. The entropy value is then estimated and normalised to [0, 1] as:

$$H_e = -\frac{\sum_{k=0}^{2^b-1} P(k)\log_2(P(k))}{\log_2(2^b-1)} \quad (52)$$

where $H_e=1$ represents the maximum spatial randomness within the ROI. At a higher level this gives an indication of surface homogeneity and ground-based obstacles. Finally, the complementary estimate of information redundancy is therefore $r=b-H_e$ where b is the smallest number of bits with which the image quantisation levels can be represented. We note that contextual information is ignored since entropy calculated using the co-occurrence matrix is slow.

To specify the rule based parameters we used the expected thermal radiance of materials based on their emissivity values taken from reference data. The emissivity values for some relevant materials include skin 0.98, soil 0.9, sand 0.8-0.9, water 0.96 and brick 0.9. Assuming suitable sensor bias and gain settings, skin with the highest emissivity should ideally correspond to the highest intensity value. Therefore we used values $\mu_\beta=255$ and $\sigma_\beta^2$ with a confidence interval of $v_\beta=3$. However, we also expect the occurrence of pixels within this confidence interval of thermal radiance to be low. This is due to the relatively small size of life-forms as a result of the low resolution of the sensor and high aircraft altitude. With this in mind, the size rule in the object detector used values $\mu_\gamma=4$ m, $\sigma_\gamma^2=1^2$ m with a confidence interval of $v_\gamma=3$. The model fitting and tracking parameters were set using the intensity reference value $K=200$, a tracker period of 5 seconds, $w=[1, 1, 1, 1]$, $v=[0.1, 0.1, 0.1, 0.1]$, $s=50$ samples, the sampling confidence interval of $3\sigma$ and the maximum time synchronisation error of $\Delta t=0.5$ seconds. For all the experiments the system parameters were kept constant throughout.

The system results for detecting indications of life-forms consist of quantifying, first, the number identified in the tracked landing site ROI, second, the probability they are positioned in the tracked landing site ROI and third, the number identified in the image. These results are shown in FIGS. 11a to 11d as blue dotted, red dashed-dotted and green continuous lines respectively. This information is plotted on both left and right y-axes against the system tick on the x-axis, which in these experiments is equivalent to the video frame rate.

The results show that generally the system did not identify indications of life-forms in the landing site during the flights for data sets 121 and 160. This was to be expected as none were present in these data sets. Frequently, however, the results do quantify several unexpected detections of indications of life-forms outside of the landing site region. From examining the video data, these detections tend to be moving cars travelling in the vicinity. They are discriminated by the high thermal radiance emitted from the tyres, engine and cabin, which also trigger our life-form size rule. The probability of these being in the position of the landing site is correctly computed as zero.

Towards the end of data sets 121 and 160 the results show a large spike in the number of detections of indications of life-forms. This occurred when the aircraft was flying at its lowest altitude at less than 100 m. These detections are incorrect. They are caused from the high contrast and life-form sized markings on the runways. Whilst they do appear in the landing site, the probability in position is low, given the error in the parameters used in the observation model. We also show enlarged views of these periods of time in FIGS. 11c and 11d. These illustrate that the corresponding time period was also very short compared to the overall length of the flight.

Since we are only interested in the number of indications of life-forms present at each time step, correspondence of life-forms is not performed. This can mean, however, that the system does not give consistent detections in time as a result of subtle changes in object radiance or environmental conditions or changing viewing angle in time. We foresee that future work will represent the position of each indication of a life-form in the state space of the Kalman filter used in Section 8.

Figure 11A:
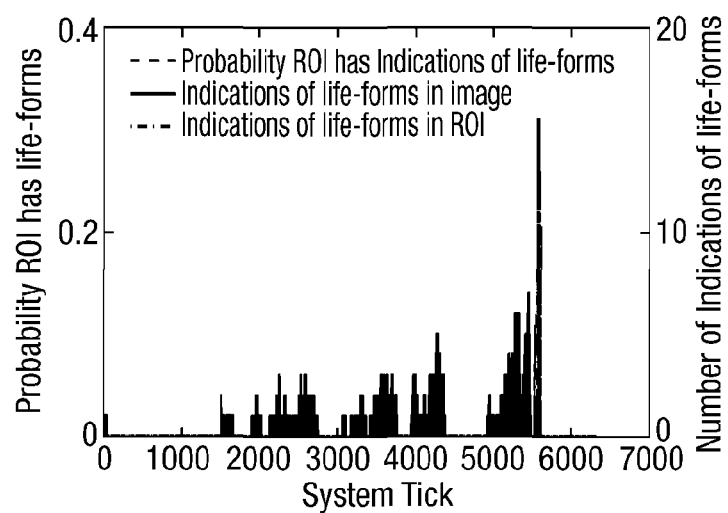
FIG. 11 illustrates the results for data sers 121 in (a, c, e) and 160 in (b, d, e) where (a, b) show indications of critical time period of detecting life-forms and (e-f) surface homogeneity values.
Figure 11B:
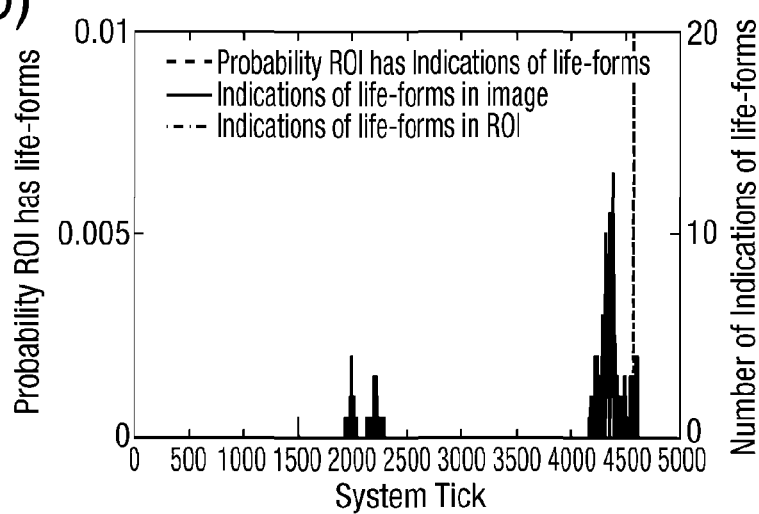
Figure 11C:
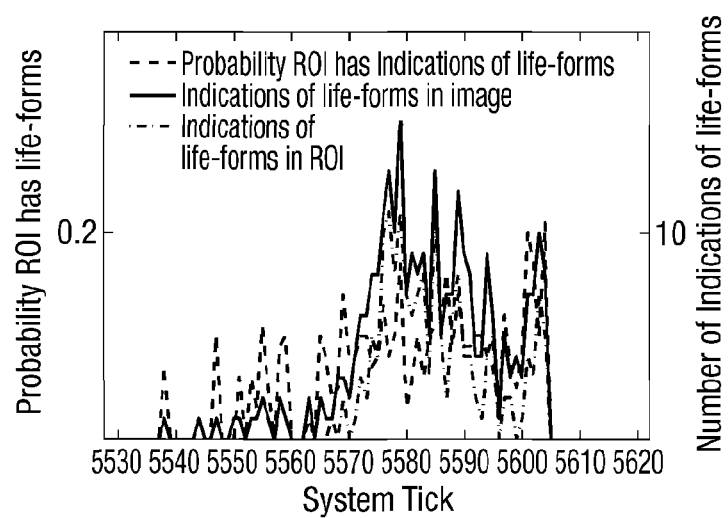
Figure 11D:
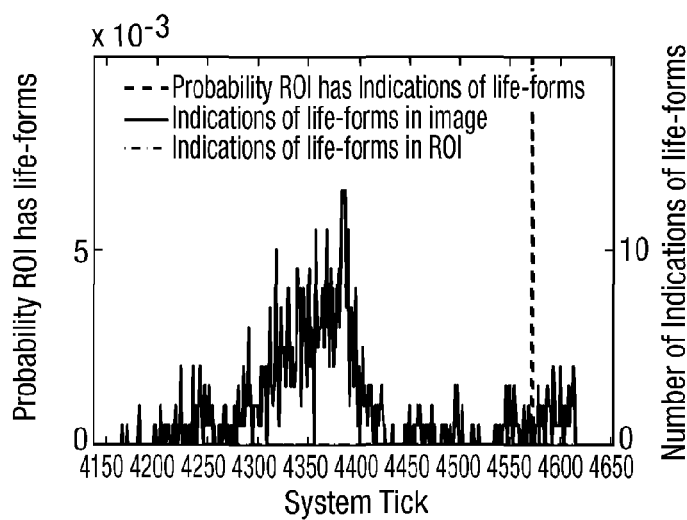
Figure 11E:
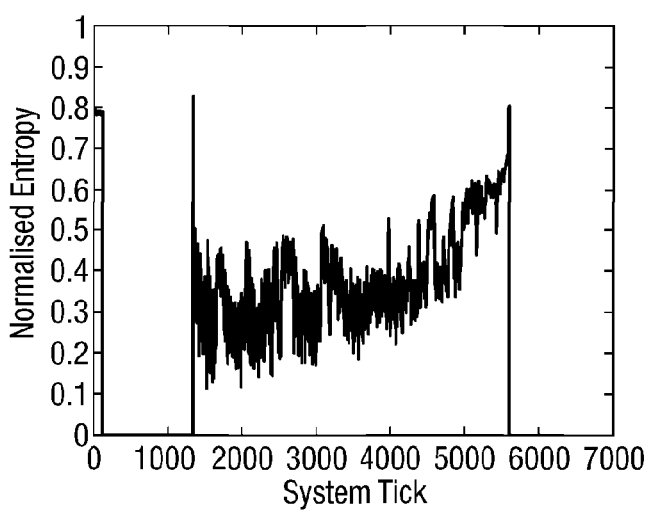
Figure 11F:
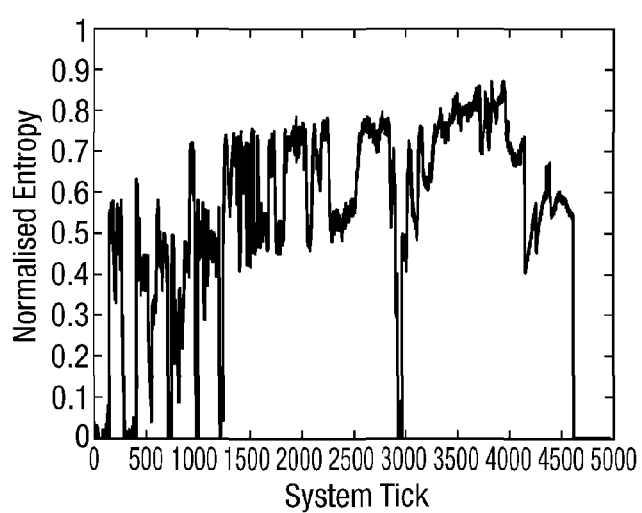
Figure 12A:
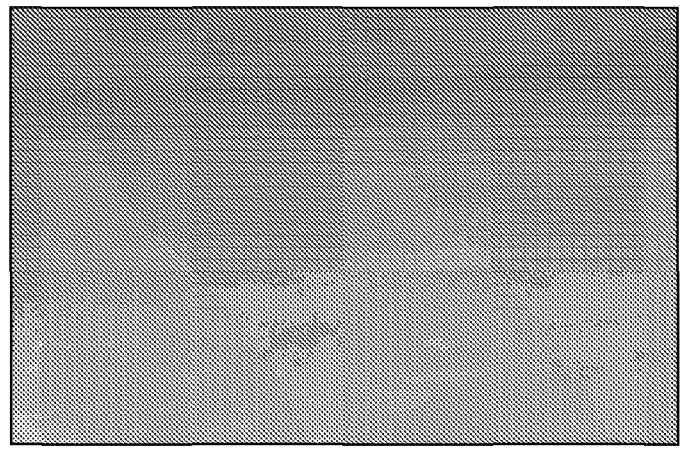
FIG. 12 illustrates examples of the typical artefacts images with low contrast and with poor contrast with banding from the sensor during trials; and, FIG. 13 illustrates example infrared images after preprocessing.
Figure 12B:
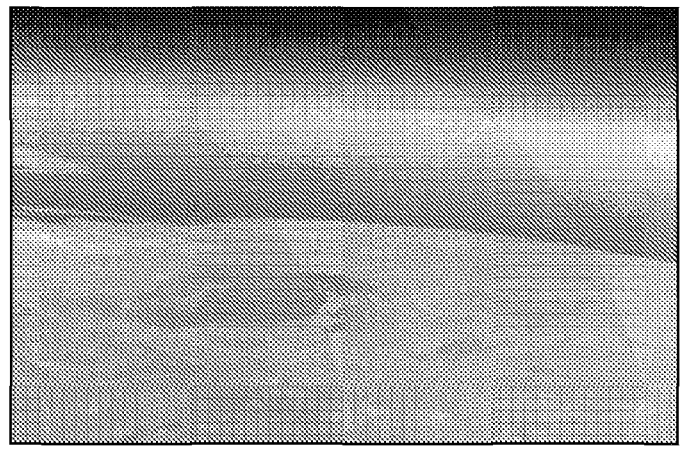
Figure 13A:
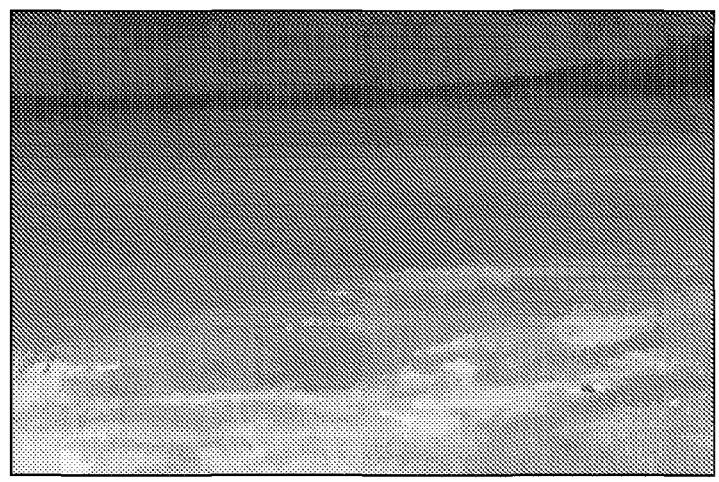
Figure 13B:
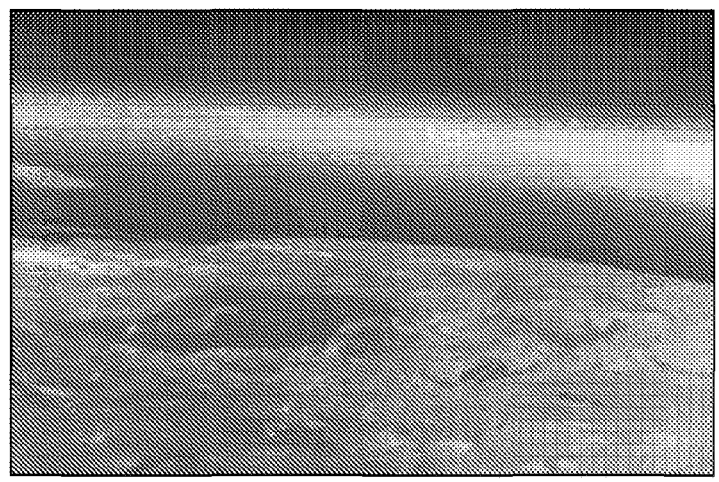
Figure 13C:
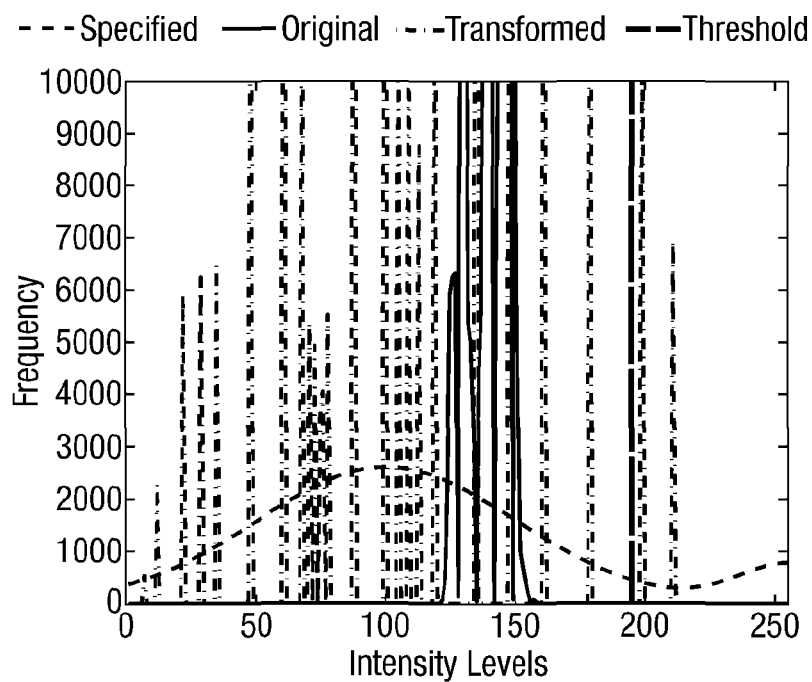
Figure 13D:
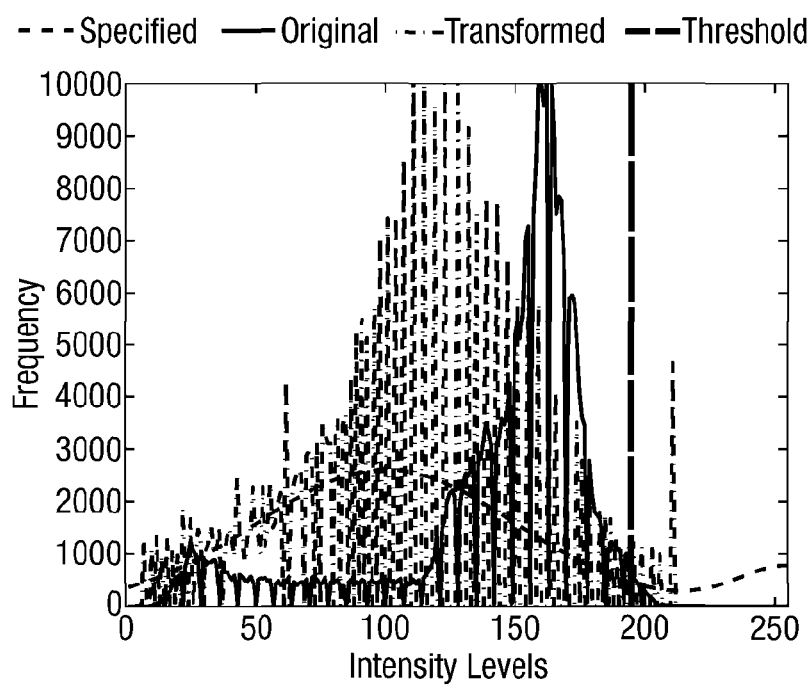

We also show the surface homogeneity results in FIGS. 11e and 11f for data sets 121 and 160 respectively. These provide an indication of the texture of the ground surface in the tracked landing site ROI. In general we anticipated that the entropy would increase as the aircraft approached the landing site since its resolution would increase. Whilst this can be seen in the results from data set 121, the results from data set 160 show a more erratic behaviour. This was mainly due to the camera gain settings being adjusted during the flight, as an attempt to improve the contrast. We anticipate that this measure of information content would be more useful for non-official landing sites, such as agricultural fields, which is the main requirement of the system.

The geo-referenced camera observation model with corresponding projection uncertainty is a key part of the system. The model allows for any GPS landmark in the FOV to be transformed from the world to the local frame as pixels and back projected into GPS coordinates. This allows applicability to both database approaches (where a target landing site is projected into the image), but also image-based approaches (where a target landing site is extracted from the image). The performance of the observation model used is dependent on the precision of all the intrinsic and extrinsic parameters, the accuracy of the modelling and time synchronisation between INS and video data. Unfortunately, no camera intrinsic and extrinsic geometry or radiometric calibration data was available. This was in part due to the difficulties in generating a sufficiently robust calibration procedure. However, some experiments using known targets were used to estimate the focal length. The results from these correctly aligned with the sensor data sheet and provided an error tolerance to be used by the system.

The rule based target object detector for identifying indications of life-forms described in used intensity and size information. Both measuring intensity and size are dependent on the quality of the image and observation model. We found that given the data, our results showed promise and that the algorithm performed with linear time complexity. In the future a narrower lens and larger focal length would be specified. This would then be mounted on a motorised pan-tilt turret already supported by our current observation model. This would also remove the contrived setup where the pilot has to fly the aircraft to keep the landing site in the camera FOV, by actively controlling the camera pan and tilt. The improved pixel to meter scaling would also allow the feasibility of including shape information into the rules.

The information content of the ROI was used to provide a measure of the landing surface topology. The entropy value was expected to increase with the increasing resolution of the ROI as the aircraft altitude decreased. We expected a low entropy to indicate an area of uniform thermal radiance, and a high entropy to indicate different materials and objects within the ROI. We anticipate that this will be more informative for non-official landing sites.

Unfortunately, with the current sensor data there seems little alternative due to the low resolution and contrast.

The performance of the horizon line estimator also uses the geo-referenced observation model. This is apparent in our experiments, since the estimated position of the horizon line in the image shows inaccuracies caused by timing synchronisation errors. However, most importantly the horizon line estimate is completely independent from the image content, allowing it to ensure that the estimated ROI is completely on the ground plane. Uniquely, the horizon line position can be estimated whether it falls in the image or not. A future improvement would be to incorporate the image based position coordinates of the horizon line in the Kalman filter state for tracking.

The penultimate position estimate of the landing site in the image comes from the shape preserved model fitting with appearance constraint based on the original projection. The accuracy of this depends on the number of samples used and the ability to capture the significant sources of error in the observation model and system. We used the errors in the pose and camera focal length parameters to determine the uncertainty in the projection of the observations. The same errors allowed the generation of a set of sample landing sites in order to select the best fitting model using the image data. The minimisation using the appearance constraint required a reasonable level of image quality but for the most part worked using our data.

The observation parameters were then updated based on the associated smoothed correction estimates that were used to generate the fitted model. Since samples are generated about the projected ROI the solution is dependent on the observation model being reasonable. We observed that with increasingly unique shaped landing sites such as the designs used on helipads, the better the fitting performance. In the future we will exploit different image based features to extract and a higher number of parameters to increase robustness of the model fitting.

The final position estimate of the landing site in the image was from using a Kalman filter to track the model fitted ROI in the local coordinate frame. The Kalman filter combined the uncertainty of the model fitted measurements into the estimation process in time. This generated the final position of the landing site from the coordinates stored in the database. The simple use of a Kalman filter acted as a smoother to generate a mean estimate using the observations.

From the foregoing, there has been presented a computer vision based component to support the online localisation and analysis of pre-surveyed or marked landing sites, for unmanned or manned aircraft at near real-time processing rates. It has been demonstrated that a shape preserved model sampling, fitting and tracking process allows the system to operate at altitudes where feature point extraction and correspondence is implausible. Furthermore, the GPS-driven geographic-spatial-referencing observation model is suitably generic to support our future ambitions. These include actively controlling the camera, deriving GPS positions from image based measurements and supporting the integration into a suitable flight simulation environment. It is a future aim to increase the INS sampling rate, accuracy of the data synchronisation and calibration procedure.

APPENDIX 1

Histogram Specification For Sensor Selection

The detector elements in the focal plane array (FPA) of the microbolometer are fairly non-uniform in their response to thermal radiance. This is due to variations in the manufacturing process and detector material characteristics. The Thermoteknix Miricle camera attempts to correct for this by using a one-point non uniform-correction (NUC). This uses the mechanical shutter in the closed position periodically to generate a flat-field uniform image. The difference between the output of each element in the FPA and the far-field image allows an offset parameter $O_{uv}$ to be calculated for a fixed value of gain $G_{uv}$. Assuming a linear model these two parameters allow the pixel intensity k correction to be made using:

$$I^l(k;u,v) = G_{uv} I(k;u,v) + O_{uv} \tag{53}$$

Positive offsets shift the intensity distribution to the right hand side increasing image brightness and the opposite for negative offsets. The gain value $G_{uv}$ is factory set and performs a multiplication or division to compress or expand the intensity distribution. Unfortunately the process generates frozen frames in between the integration period (every 45 seconds), the offset coefficients drift over time due to ambient temperature change, assumes the factory gain values remain valid and relies on the thermal radiance of the shutter being a fair representation of the scene. As a result image artifacts exist from non-uniform gain effects, which appear as vertical stripes and images with a low contrast ratio.

It is desirable to control the offset and gain above and beyond the one-point NUC already applied, in order to control the contrast ratio of the image. This will support downstream algorithms by enforcing that the contrast ratio is optimal for the target and the image intensity distribution not uniform.

One technique optimises a set of gain and offsets based using a least-mean-squared algorithm with a reference image based on the current frame. Hardware is used to support real-time performance. Alternatively, histogram plateau equalization can be used. This does not require hardware support to achieve real-time performance and does not require a reference image. This adaptively sets a gain parameter for the maximum frequency of each grey level value for each image. Where this is either 0 a histogram projection is performed and a histogram equalisation is performed for values greater than the maximum frequency.

We use histogram specification, which sets the offsets and gains statistically according to a desired non uniform probability distribution function (pdf). To specify the pdf we use the expected distribution of pixels thermal radiance of objects base on their emissivity values in the scene. The emissivity values for objects in our scene that are visible in the image include skin 0.98, soil 0.9, sand 0.8 to 0.9, water 0.96 and brick 0.9. We use normal probability distributions to model the intensities in the image for skin in the scene as $k \sim \mathcal{N}(\mu_\beta, \sigma_\beta^2)$ and all other intensities for everything else in the scene as $k \sim \mathcal{N}(\mu_\alpha, \sigma_\alpha^2)$. Since skin has a high emissivity corresponding to the highest value of intensity in the image, we use values $\mu_\beta = 255$ and $\sigma_\beta^2 = 20^2$. For the background we use values $\mu_\alpha = 100$ and $\sigma_\alpha^2 = 50^2$. However, we also expect the probability of a pixel with thermal radiance value for skin to be low. This is due to the relatively small size of objects with skin and low resolution of the sensor. Therefore we set the a-priori probabilities that a pixel with belongs to skin as $P(\beta) = 0.2$ and the complement $P(\alpha) = 1 - P(\beta)$. Both distributions can be combined to form the bimodal distribution model for a grey level k for the image:

$$f(k) = MN(P(\alpha)f(k;\mu_\alpha,\sigma_\alpha^2) + P(\beta)f(k;\mu_\beta,\sigma_\beta^2)) \tag{54}$$

The validity of the specified histogram or pdf is understood as the equality between the image size and the sum of histogram bins, that is:

$$\sum_{k=0}^{2^b-1} f(k) = M \times N \quad (55)$$

This model allows us to specify the ideal properties of a sensor for this problem. Our sensor is neither radiometrically calibrated nor compliant with our ideal intensity model. Next, we build a lookup-table (LUT) using both the cumulative histogram of the image $\check{F}(k)$ and cumulative specified histogram $F(k)$. For each gray level l, we find $\check{F}(k)$, and then find a k level so that $F(k)$ best matches, by minimising:

$$|\check{F}(l) - F(j)| = \min_k |\check{F}(l) - F(k)| \quad (56)$$

where a LUT entry is LUT[l]=j. Applying the LUT yields the maximum available contrast ratio of 256:1 for the spectral band 7 to 14 μm quantised over $2^b-1$ grey levels where b=8 is the number of bits. The only image pre-processing included a median filter and notably the histogram specification described above. The latter was implemented to attempt to improve the image contrast in order to make indications of life-forms more discriminating from the background. Whilst the contrast of the images improved, the images captured in general were too quantized with a poor dynamic range to make a sufficient benefit for our problem. This was due to the auto-ranging, which sets the gains and bias, using a reference cold and hot target measurements that were for a wider range for general scene analysis. This is apparent in data set 121. This led to adjusting the gain settings during flight based on the histogram specification output. This was performed in data set 160. Ideally this software based pre-processing of the images would not be required, since it is potentially the most computationally complex algorithm used in the system. Adding each pixel to its appropriate temporary bin in the histogram requires O(MN). This is done twice to generate the histogram equalised image and specified histograms. To generate the LUT requires a linear search over all grey levels O(K) for each grey-level k. The total time complexity is thus stated as O(2MN+KK), which is reduced to O(MN) by generating the LUT off-line.

The invention claimed is:

1. A method of identifying and analysing an aircraft landing site during flight, the method including using a camera to capture in-flight images of the ground in the region of a possible landing site, using a database of computer modelled images of possible aircraft landing sites mapped to a global co-ordinate reference frame to compare the in-flight images with a modelled image of the possible landing site and optimising correspondence therebetween to obtain an in-flight image optimally mapped to the global co-ordinate reference frame, and analysing a landing site corresponding to the optimally mapped in-flight image to ascertain the presence of any obstructions thereon.

2. A method as in claim 1 in which the analysis of the landing site for obstructions includes analysing the in-flight image to detect image intensity above a threshold value, whereby to determine the presence of an obstruction.

3. A method as in claim 2 in which the analysis of the landing site for obstructions includes analysing the portion of the in-flight image corresponding to the obstruction to detect the surface area of the obstruction.

4. A method as in claim 3 in which the analysis to detect the surface area of the obstruction includes calculating a convex hull for the obstruction to define multiple polygons in the image.

5. A method as in claim 4 including back projecting each polygon from a local image co-ordinate frame to the global co-ordinate reference frame, whereby to calculate the actual area of the obstruction and detect area above a threshold value.

6. A method as in claim 2 including computing the probability of a said obstruction being present on the landing site by comparing a number of time varying in-flight images to determine the relative frequency of the obstruction being detected.

7. A method as in claim 1 including determining terrain characteristics of the landing site and/or presence of obstructions on the landing site by obtaining a measure of randomness of spatial information present in a said in-flight image.

8. A method as in claim 7 in which the measure of randomness of spatial information is obtained by computing a statistical measure of the said randomness based on image intensity estimated from a grey-level histogram.

9. A method as in claim 1 in which optimising correspondence between in-flight images and a modelled image includes creating a random sample of possible landing site in-flight images spread about the mean position, translating each image into the global co-ordinate reference frame and comparing each said image with the expected mean image intensity of the landing site in the global co-ordinate reference frame and ranking each said image accordingly by minimising the difference between the sample mean intensity and the expected mean intensity whereby to optimise correspondence between in-flight images and a said modelled image.

10. A method as in claim 9 including applying a Kalman filter to filter optimally mapped in-flight images in time.

11. A method as in claim 1 including the estimating the horizon line in the optimally mapped in-flight image by applying geometric back projection of features in the global co-ordinate reference frame into the in-flight image.

12. Apparatus for identifying and analysing an aircraft landing site during flight, the apparatus including a camera adapted to capture in-flight images of the ground in the region of a possible landing site, a database of computer modelled images of possible aircraft landing sites mapped to a global co-ordinate reference frame, a computer configured to compare the in-flight images with a said modelled image of the possible landing site and to optimise correspondence therebetween to obtain an in-flight image optimally mapped to the global co-ordinate reference frame, the computer further configured to analyse a landing site corresponding to the optimally mapped in-flight image to ascertain the presence of any obstructions thereon.

13. The Apparatus as in claim 12 wherein the analysis of the landing site for obstructions carried out by the computer includes analysing the in-flight image to detect image intensity above a threshold value, whereby to determine the presence of an obstruction.

14. The Apparatus as in claim 13 wherein the analysis of the landing site for obstructions carried out by the computer includes analysing the portion of the in-flight image corresponding to the obstruction to detect the surface area of the obstruction.

15. The Apparatus as in claim 14 wherein the analysis to detect the surface area of the obstruction carried out by the computer includes calculating a convex hull for the obstruction to define multiple polygons in the image.

16. The Apparatus as in claim 15 wherein the computer is further configured to back project each polygon from a local image co-ordinate frame to the global co-ordinate reference frame, whereby to calculate the actual area of the obstruction and detect area above a threshold value.

17. The Apparatus as in claim 13 wherein the computer is further configured to compute the probability of a said obstruction being present on the landing site by comparing a number of time varying in-flight images to determine the relative frequency of the obstruction being detected.

18. The Apparatus as in claim 13 wherein the computer is further configured to determine terrain characteristics of the landing site and/or presence of obstructions on the landing site by obtaining a measure of randomness of spatial information present in a said in-flight image.

19. The Apparatus as in claim 18 in which the measure of randomness of spatial information is obtained by computing a statistical measure of the said randomness based on image intensity estimated from a grey-level histogram.

20. The Apparatus as in claim 13 wherein the computer optimises correspondence between in-flight images and a modelled image by creating a random sample of possible landing site in-flight images spread about the mean position, translating each image into the global co-ordinate reference frame and comparing each said image with the expected mean image intensity of the landing site in the global co-ordinate reference frame and ranking each said image accordingly by minimising the difference between the sample mean intensity and the expected mean intensity whereby to optimise correspondence between in-flight images and a said modelled image.

* * * * *